United States Patent
Yamamoto

(10) Patent No.: US 9,789,820 B2
(45) Date of Patent: Oct. 17, 2017

(54) OBJECT DETECTION APPARATUS

(71) Applicant: FUJITSU TEN LIMITED, Kobe-shi, Hyogo (JP)

(72) Inventor: Tetsuo Yamamoto, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 13 days.

(21) Appl. No.: 14/886,561

(22) Filed: Oct. 19, 2015

(65) Prior Publication Data
US 2016/0180176 A1    Jun. 23, 2016

(30) Foreign Application Priority Data
Dec. 18, 2014  (JP) .................. 2014-255884

(51) Int. Cl.
| | |
|---|---|
| G06K 9/00 | (2006.01) |
| B60R 1/00 | (2006.01) |
| H04N 5/225 | (2006.01) |
| B60W 30/08 | (2012.01) |
| H04N 5/14 | (2006.01) |
| G06T 7/246 | (2017.01) |
| G06T 7/269 | (2017.01) |
| G06K 9/46 | (2006.01) |

(52) U.S. Cl.
CPC .............. *B60R 1/00* (2013.01); *B60W 30/08* (2013.01); *G06K 9/00805* (2013.01); *G06K 9/4604* (2013.01); *G06T 7/246* (2017.01); *G06T 7/269* (2017.01); *H04N 5/144* (2013.01); *H04N 5/225* (2013.01); *B60R 2300/30* (2013.01); *B60R 2300/8093* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 5,764,283 | A * | 6/1998 | Pingali | .................... G06T 7/246 348/169 |
| 2005/0165550 | A1* | 7/2005 | Okada | .................... G08G 1/166 701/301 |
| 2005/0225636 | A1* | 10/2005 | Maemura | .................. B60R 1/00 348/148 |
| 2012/0140072 | A1* | 6/2012 | Murashita | .......... G06K 9/00805 348/148 |
| 2012/0213412 | A1* | 8/2012 | Murashita | ............. G06T 7/0042 382/104 |

(Continued)

FOREIGN PATENT DOCUMENTS

| | | |
|---|---|---|
| JP | H08-83345 A | 3/1996 |
| JP | 2006-174377 A | 6/2006 |
| JP | 2014-146083 A | 8/2014 |

*Primary Examiner* — Shervin Nakhjavan
(74) *Attorney, Agent, or Firm* — Oliff PLC

(57) ABSTRACT

An object detection apparatus that detects an object in a vicinity of a vehicle includes: (a) an image processing circuit configured to: (i) derive vectors representing movement of feature points in captured images acquired periodically by a camera that captures images of the vicinity of the vehicle; and (ii) detect the object based on the vectors; and (b) a controller configured to (i) acquire a velocity of the vehicle; and (ii) set a parameter that affects a number of the feature points based on the velocity of the vehicle.

15 Claims, 18 Drawing Sheets

(56) References Cited

U.S. PATENT DOCUMENTS

| | | | |
|---|---|---|---|
| 2013/0250107 A1* | 9/2013 | Okada | G06K 9/00805 348/148 |
| 2014/0037138 A1* | 2/2014 | Sato | G08G 1/166 382/103 |
| 2014/0193032 A1* | 7/2014 | Zhang | G06T 3/0012 382/103 |
| 2015/0002745 A1* | 1/2015 | Bernal | G06T 5/001 348/575 |
| 2015/0234045 A1* | 8/2015 | Rosenblum | G01S 13/931 342/71 |
| 2015/0379371 A1* | 12/2015 | Yoon | G06K 9/6289 382/103 |
| 2016/0009225 A1* | 1/2016 | Watanabe | B60R 1/002 348/148 |
| 2016/0078288 A1* | 3/2016 | Takatani | G06T 7/73 382/103 |
| 2017/0011269 A1* | 1/2017 | Yamaguchi | G06K 9/00798 |

* cited by examiner

OBJECT DETECTION APPARATUS

BACKGROUND OF THE INVENTION

Field of the Invention

This invention relates to a technology for detecting objects in a vicinity of a vehicle.

Description of the Background Art

Conventionally, an object detection apparatus that detects an object by using captured images acquired by a camera for capturing images of a vicinity of a vehicle is used. The object detection apparatus detects the object based on the captured images, for example, captured by a front camera. By informing a user (mainly driver) of a detection result of the object detection apparatus, the user can easily understand an other vehicle and/or another object approaching from a position that is a blind spot at an intersection having poor visibility, in a parking lot, etc.

One of well-known object detection methods used for such an object detection apparatus is an optical flow method. In the optical flow method, feature points are extracted from captured images (frames) acquired periodically and optical flows that are vectors representing movement of the feature points in the captured images are derived. Then, based on the optical flow, the object in the vicinity of a host vehicle is detected.

In a case where the optical flow method is used, while the host vehicle is traveling, optical flows are derived not only for an object in motion but also for a subject that is a background object. The optical flows relating to such a subject that is a background object may be a cause of false detection of an object.

In conventional object detection apparatuses, object detection sensitivity is set in a predetermined level to avoid such false detection. Therefore, it is difficult to improve object detection performance of the object detection apparatuses.

SUMMARY OF THE INVENTION

According to one aspect of the invention, an object detection apparatus that detects an object in a vicinity of a vehicle includes: (a) an image processing circuit configured to: (i) derive vectors representing movement of feature points in captured images acquired periodically by a camera that captures images of the vicinity of the vehicle; and (ii) detect the object based on the vectors; and (b) a controller configured to (i) acquire a velocity of the vehicle; and (ii) set a parameter that affects a number of the feature points based on the velocity of the vehicle.

Since the parameter that affects the number of the feature points is set based on the velocity of the vehicle, object detection performance can be improved by appropriately adjusting the object detection performance based on the velocity of the vehicle.

According to another aspect of the invention, the controller determines whether the vehicle is stopped or is traveling, based on the velocity of the vehicle, and sets the parameter such that the number of the feature points is increased while the vehicle is stopped as compared to while the vehicle is traveling.

Since the parameter is set such that the number of the feature points is increased while the vehicle is stopped, the object detection performance can be improved by increasing the object detection performance while the vehicle is stopped.

Therefore, an object of the invention is to improve object detection performance.

These and other objects, features, aspects and advantages of the invention will become more apparent from the following detailed description of the invention when taken in conjunction with the accompanying drawings.

DESCRIPTION OF THE EMBODIMENTS

Embodiments of the invention will be hereinafter described with reference to the drawings.

<1. System Configuration>

Figure 1:
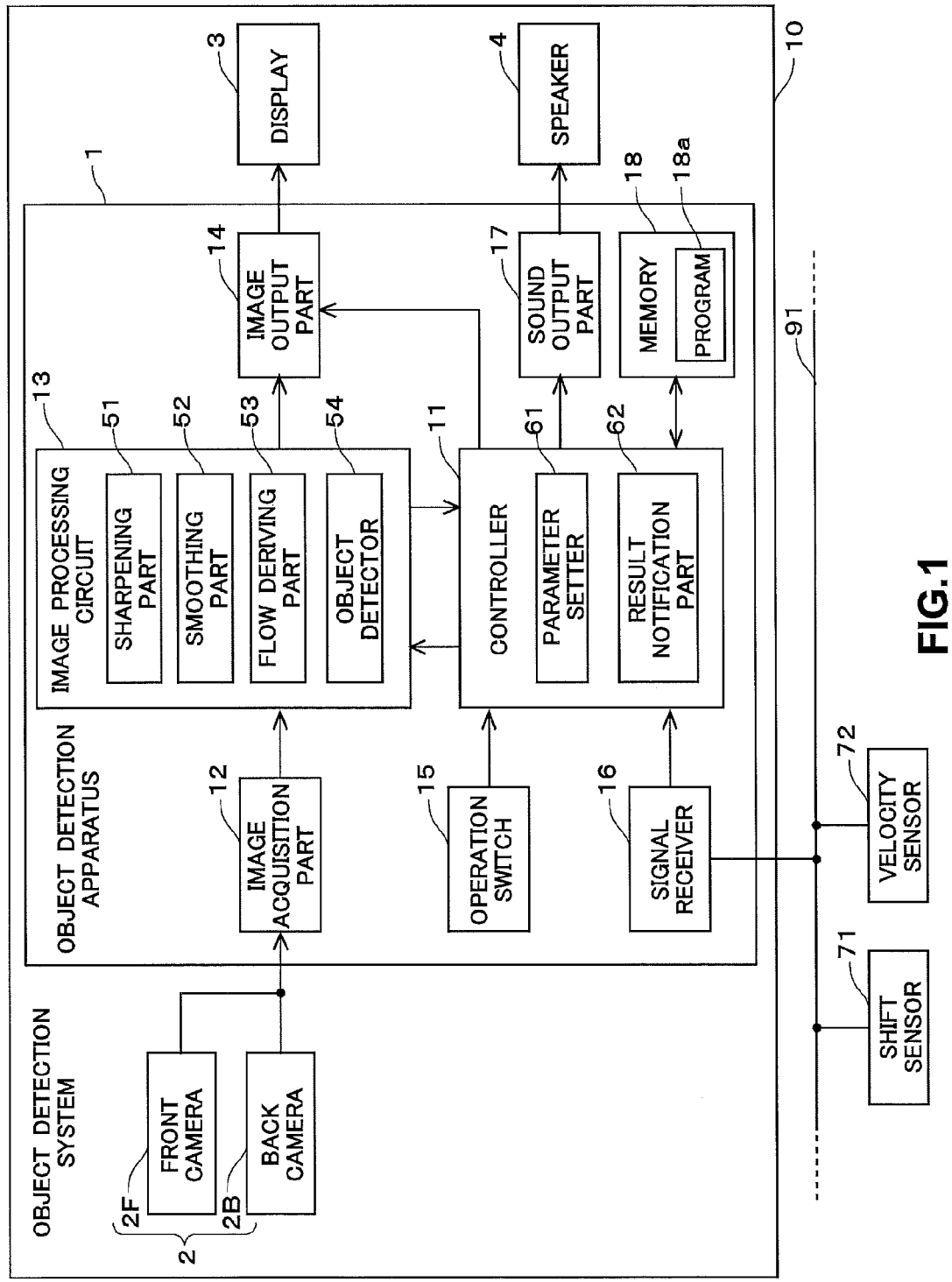
FIG. 1 illustrates a schematic configuration of an object detection system.

FIG. 1 illustrates a schematic configuration of an object detection system 10 in this embodiment. The object detection system 10 is mounted on a vehicle, such as a car, and has a function of detecting an object moving in a vicinity of the vehicle and notifying a user of a detection result in a case where the object has been detected. The vehicle on which the object detection system 10 is mounted is hereinafter referred to as "host vehicle."

The object detection system 10 includes a display 3 that displays captured image and a speaker 4 that generates sound. The display 3 is disposed in a position where the user (mainly driver) can see the display 3 in a car cabin of the host vehicle and notifies the user of various types of information. In addition to a basic display function, the display 3 may include a function such as a navigation function for providing a route guidance to a destination. The speaker 4 is disposed in the car cabin of the host vehicle and notifies the user of the information by the sound.

Moreover, the object detection system 10 includes a plurality of cameras 2 that acquire the captured images by capturing images of the vicinity of the host vehicle. Each of the plurality of camera 2 includes a lens, an image sensor and an image processing part, acquires the captured images electronically and performs a predetermined image processing of the acquired captured image. Each of the plurality of cameras 2 acquires the captured images periodically in a predetermined cycle (for example, 1/30 second cycle).

Figure 2:
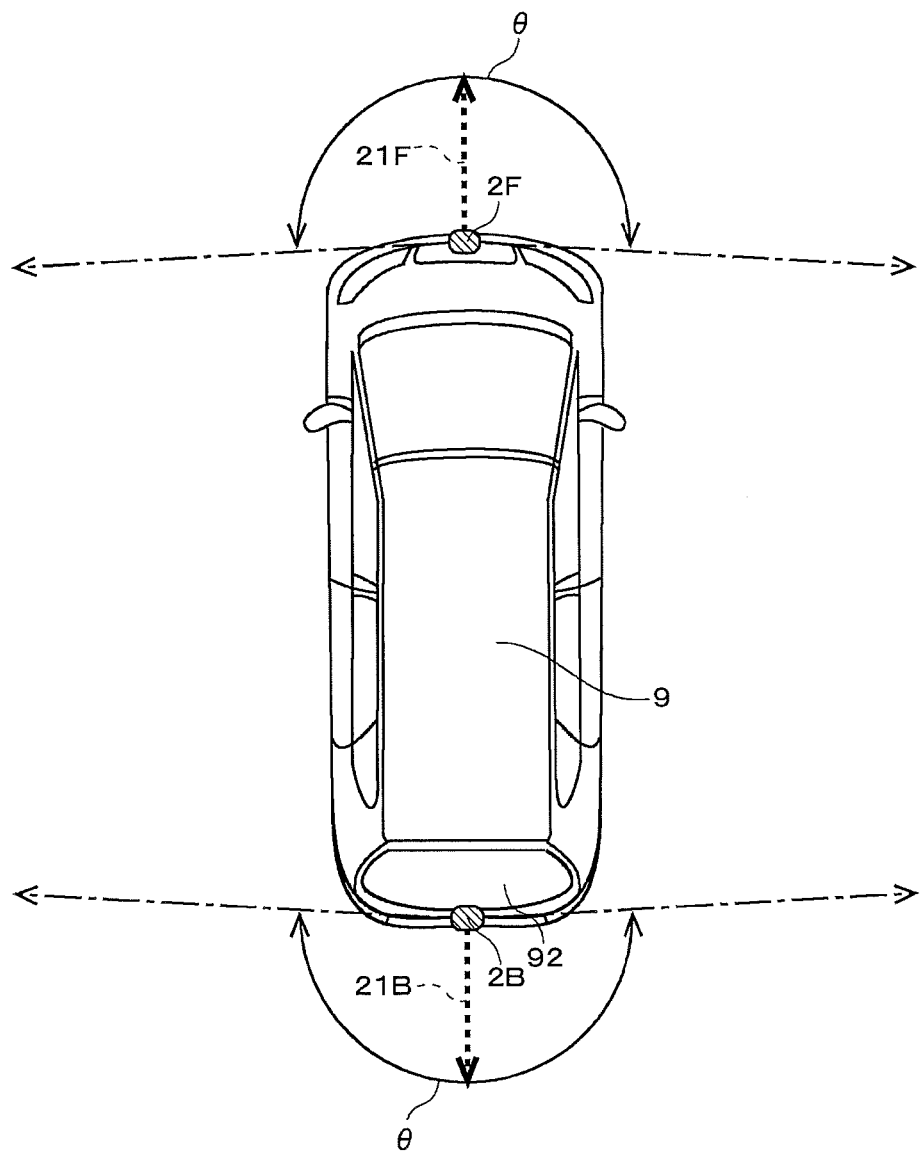
FIG. 2 illustrates directions in which two cameras capture images respectively.

The plurality of cameras 2 include a front camera 2F and a back camera 2B. FIG. 2 illustrates directions in which the two cameras 2F and 2B capture images respectively.

As shown in FIG. 2, the front camera 2F is provided to a bumper at a front end of the host vehicle 9, having an optical axis 21F of the front camera 2F directed forward in a longitudinal direction of the host vehicle 9. Therefore, the front camera 2F captures an image of a front region of the host vehicle 9 and acquires the captured image showing a situation in front of the host vehicle 9. Moreover, the back camera 2B is provided to a rear door 92 at a rear end of the host vehicle 9, having an optical axis 21B directed backward in the longitudinal direction of the host vehicle 9. Therefore, the back camera 2B captures an image of a rear region of the host vehicle 9 and acquires the captured image showing a situation in the rear region of the host vehicle 9.

A fisheye lens is used for each of the plurality of cameras 2, and each camera 2 has a view angle θ of 180 degrees or more. Therefore, the front camera 2F captures the image of the front region of 180 degrees or more extending in a horizontal direction in front of the host vehicle 9, and the back camera 2B captures the image of the rear region of 180 degrees or more extending in the horizontal direction behind the host vehicle 9.

One of the plurality of cameras 2 is selected according to an operation mode and the object detection system 10 causes the display 3 to display the captured image acquired by the selected camera 2. The object detection system 10 causes the display 3 to display the captured image acquired by the front camera 2F in a front mode and causes the display 3 to display the captured image acquired by the back camera 2B in a back mode. The operation modes are switched, for example, according to a traveling direction of the host vehicle 9. Thus, the user can understand the situation in the vicinity of the host vehicle 9 in the traveling direction substantially on a real-time basis.

Moreover, the object detection system 10 detects an object approaching the host vehicle 9 based on the captured image acquired by the camera 2 selected according to the operation mode. In a case where the object detection system 10 detects the object, the object detection system 10 notifies the user of the detection result via the display 3 and the speaker 4. Thus, the user can easily understand an object approaching from a position that is a blind spot for the user at an intersection having poor visibility, in a parking lot, etc.

Figure 3:
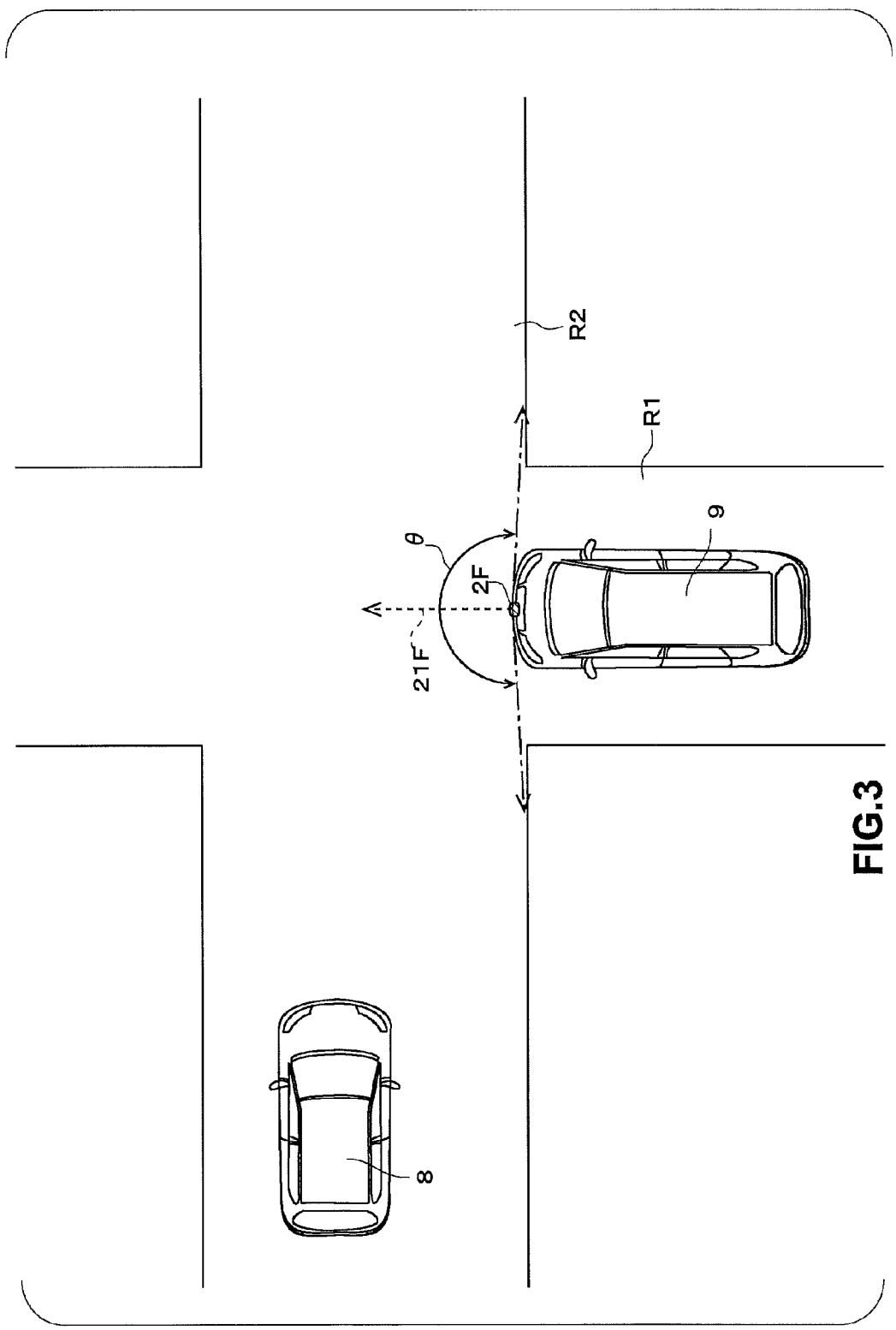
FIG. 3 illustrates an example of a scene where the object detection system is used.

FIG. 3 illustrates an example of a scene where the object detection system 10 is used. FIG. 3 illustrates the scene where the host vehicle 9 is approaching an intersection having poor visibility. The operation mode of the object detection system 10 in FIG. 3 is in the front mode. As described above, the front camera 2F has the view angle θ of 180 degrees or more. Therefore, as shown in FIG. 3, in a state in which only the front end of the host vehicle 9 is at the intersection, it is possible for the front camera 2F to capture an image of a region extending in a horizontal direction of the intersection. Therefore, the object detection system 10 acquires the captured image showing a situation of an other road R2 which is substantially orthogonal to a road R1 on which the host vehicle 9 is traveling, and causes the captured image to be displayed on the display 3.

Moreover, the captured image acquired in a manner described above includes an image of an object (such as an other vehicle 8 and a pedestrian), on the other road R2, which is approaching the host vehicle 9 either from a right side or a left side of the host vehicle 9. The object detection system 10 detects the object approaching the host vehicle 9 by using the captured image and notifies the user of the detection result. Thus, the user can easily understand the object approaching the host vehicle 9 before a whole body of the host vehicle 9 enters the intersection.

With reference back to FIG. 1, the object detection system 10 includes an object detection apparatus 1 that detects the object approaching the host vehicle 9 based on the captured images acquired by the plurality of cameras 2. The object detection apparatus 1 includes an image acquisition part 12, an image processing circuit 13, and an image output part 14.

The image acquisition part 12 acquires the captured images captured by the camera 2 selected according to the operation mode. The image acquisition part 12 acquires the captured images from the camera 2 periodically in a predetermined cycle (for example, 1/30 second cycle). Each of the captured images acquired by the image acquisition part 12 serves as one frame of an image signal.

The image processing circuit 13 is a hardware circuit, such as ASIC and FPGA, that executes a predetermined image processing of the captured images acquired by the image acquisition part 12. The image processing circuit 13 performs an object detection process for detecting an object by an optical flow method. A sharpening part 51, a smoothing part 52, a flow deriving part 53, and an object detector 54 shown in the drawing are functions relating to the object detection process.

The sharpening part 51 performs a sharpening process for emphasizing change of pixel values of the captured image. The sharpening part 51 enhances a contour of a subject image included in the captured image by performing the sharpening process to make the subject image sharper.

The smoothing part 52 performs a smoothing process for reducing the change of the pixel values of the captured image. The smoothing part 52 reduces random noises included in the captured image by preforming the smoothing process.

Figure 4:
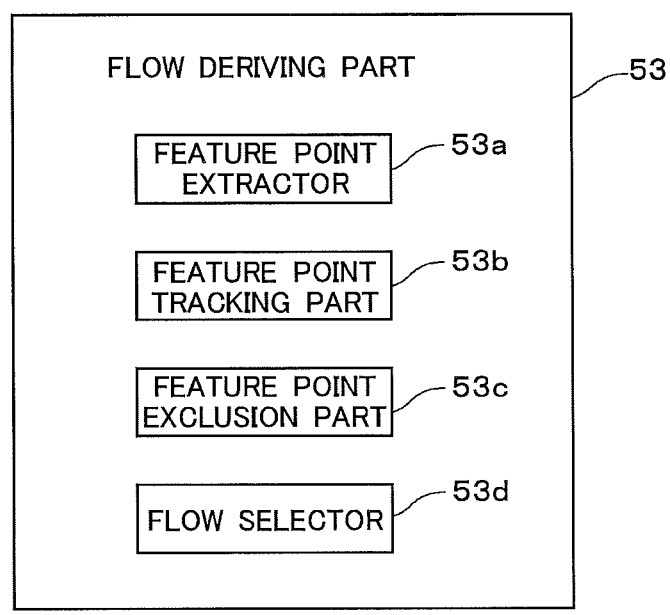
FIG. 4 illustrates a block diagram showing functions included in the flow deriving part.

The flow deriving part 53 derives optical flows based on feature points of the captured images. FIG. 4 illustrates a block diagram showing functions included in the flow deriving part 53 relating to derivation the optical flows. Each of a feature point extractor 53a, a feature point tracking part 53b, and a feature point exclusion part 53c, and a flow selector 53d shown in FIG. 4 is a function included in the flow deriving part 53. Details of these functions are described later.

With reference back to FIG. 1, the object detector 54 detects an object based on the optical flows derived by the flow deriving part 53. When the object detector 54 detects the object, the image processing circuit 13 outputs the detection result of the object detection process.

The image output part 14 generates a display image including various types of information along with the captured image and converts the display image into the image signal in a predetermined format, such as NTSC, and outputs the image signal to the display 3. Thus, the display image including the captured image is displayed on the display 3. The image output part 14 uses the captured image including the sharper subject image after the sharpening process, to generate the display image.

Moreover, the object detection apparatus 1 includes an operation switch 15, a signal receiver 16, a sound output part 17, a memory 18, and a controller 11.

The operation switch 15 is provided in the car cabin of the host vehicle 9. The operation switch 15 receives an operation made by the user and inputs a signal showing a content of the operation into the controller 11.

The signal receiver 16 receives signals from other apparatus via the in-vehicle network 91 provided in the host vehicle 9 to acquire a vehicle condition of the host vehicle 9. The signal receiver 16 inputs the received signals in the controller 11.

The signal receiver 16 receives signals transmitted by a shift sensor 71 and a velocity sensor 72. The shift sensor 71 detects a shift position which is a position of a shift lever of a transmission of the host vehicle 9, and transmits the signal showing the shift position. The shift position indicates the traveling direction of the host vehicle 9. The velocity sensor 72 detects a velocity of the host vehicle 9 based on rotations of a wheel shaft of the host vehicle 9, and transmits the signal showing the velocity of the host vehicle 9. Thus, the signal receiver 16 acquires, as a vehicle state of the host vehicle 9, the shift position and the velocity of the host vehicle 9.

The sound output part 17 generates a sound signal based on a signal from the controller 11, and outputs the generated sound signal to the speaker 4. Thus, the speaker 4 generates sounds, such as a warning sound.

The memory 18 is, for example, a nonvolatile memory such as a flash memory and stores various types of information. The memory 18 stores, for example, a program 18a serving as a firmware. Such a program 18a is acquired by download via a network or readout from a non-transitory computer-readable recording medium, such as a memory card.

The controller 11 is a microcomputer including a CPU, a RAM, and a ROM, etc., and controls each part of the object detection apparatus 1 including the image processing circuit 13. The controller 11 changes the operation mode of the object detection system 10 according to, for example, the shift position acquired by the signal receiver 16 and the content of the operation made with the operation switch 15.

Various functions of the controller 11 are implemented by software. In other words, the functions of the controller 11 are implemented by executing the program 18a stored in the memory 18 (arithmetic processing of the CPU in accordance with the program 18a). A parameter setter 61 and a result notification part 62 in the drawing are part of the functions implemented by executing the program 18a.

The parameter setter 61 sets one or more parameters which are used when the image processing circuit 13 implements the object detection process. The parameter setter 61 adjusts detection sensitivity of the object detection apparatus 1 to detect an object, by changing such a parameter. Details of the parameters set by the parameter setter 61 will be described later in detail.

The result notification part 62 notifies the user of the detection result of the object detection process performed by the image processing circuit 13. The result notification part 62 receives the detection result output by the image processing circuit 13. Moreover, the result notification part 62 transmits a signal to the image output part 14 and causes the image output part 14 to generate the display image showing the detection result. Thus, the display image showing the detection result is displayed on the display 3. Moreover, the result notification part 62 transmits a signal to the sound output part 17 so as to cause the sound output part 17 to generate the sound signal according to the detection result. Thus, the warning sound is output from the speaker 4, according to the detection result.

Figure 5:
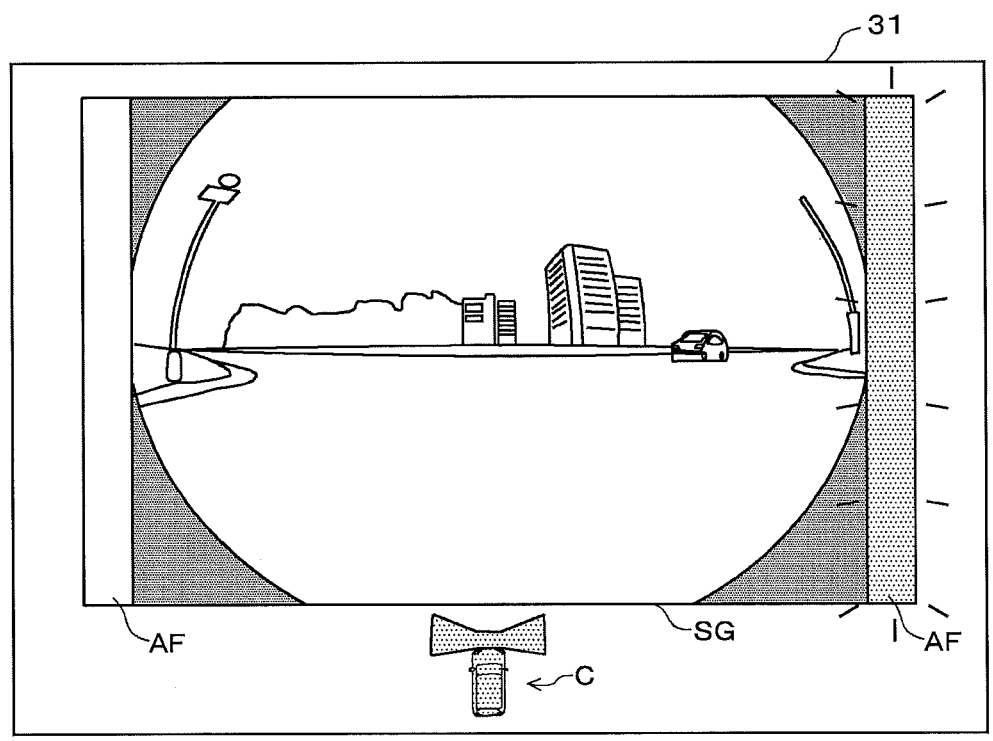
FIG. 5 illustrates an example of a display image.

FIG. 5 illustrates an example of a display image 31 displayed on the display 3 in the front mode. The display image 31 includes a captured image SG acquired by the camera 2, two warning parts AF indicating the detection result of the object detection process, and an icon C showing the operation mode.

The two warning parts AF are rectangular areas extending vertically and are disposed to a right outside and a left outside of the captured image SG, respectively. In a case where there is an object approaching from the right side of the host vehicle 9, as shown in FIG. 5, the warning part AF on the right side blinks in a predetermined color (for example, yellow). On the other hand, in a case where there is an object approaching from the left side of the host vehicle 9 s, the warning part AF on the left side blinks in a predetermined color.

Moreover, in the case where there is the object approaching the host vehicle 9 as described above, a predetermined warning sound is output from the speaker 4. Thus, the user can easily understand presence of the object approaching the host vehicle 9 and the direction in which the object is present.

<2. Outline of Object Detection Process>

Next, an outline of the object detection process performed by the image processing circuit 13 is described. As described above, the image processing circuit 13 detects the object by the optical flow method that is one of frame correlation methods which use a plurality of captured images (frames) acquired periodically. The object detection process is performed for each of the captured images (frames).

Figure 6:
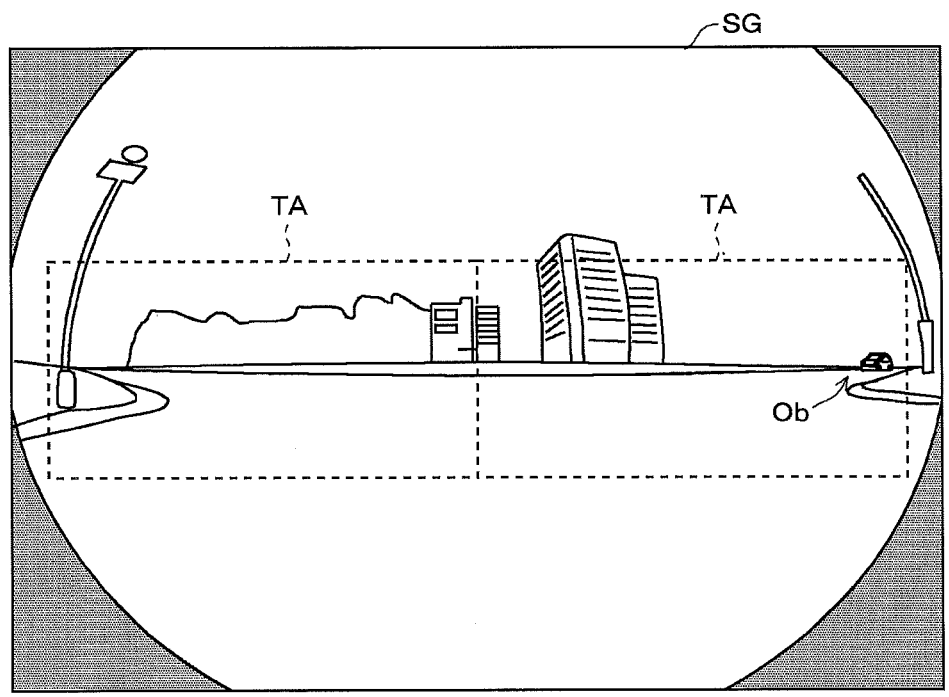
FIG. 6 illustrates an example of a captured image acquired by a front camera.
Figure 7:
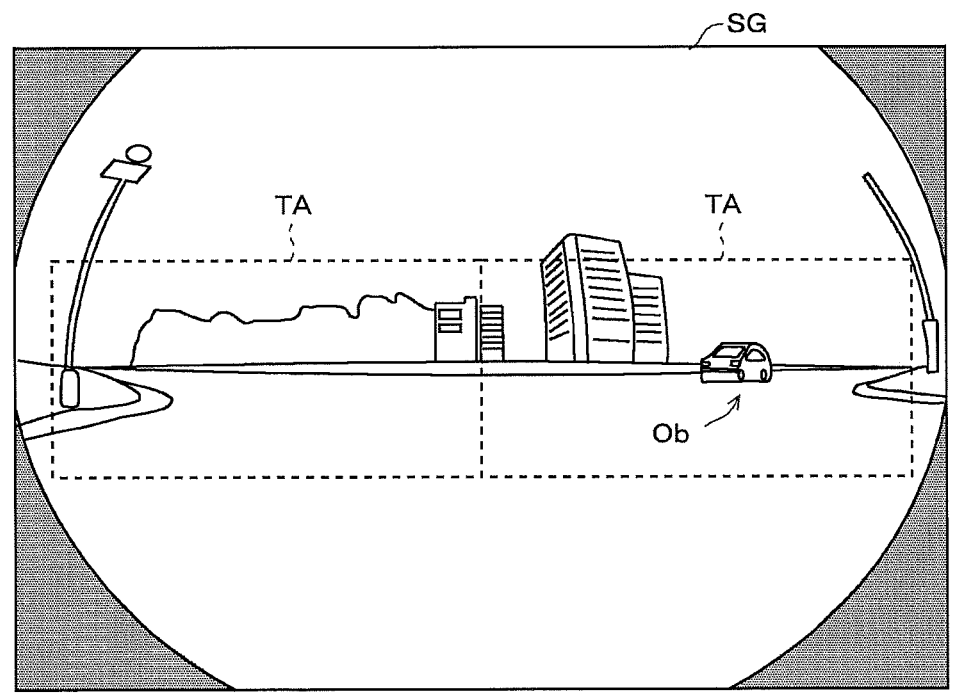
FIG. 7 illustrates an example of a captured image acquired by the front camera.
Figure 8:
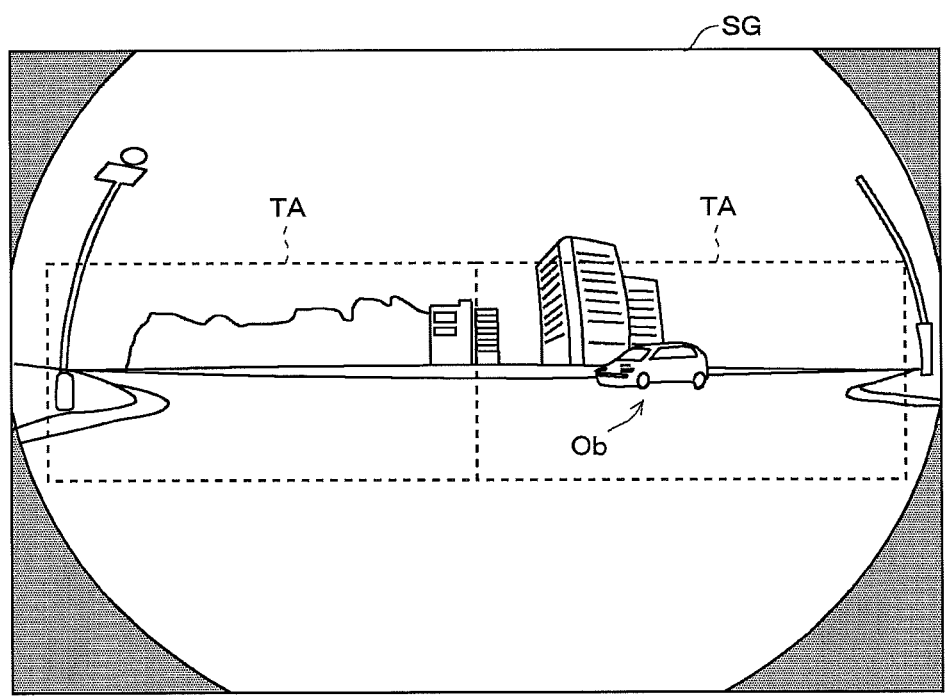
FIG. 8 illustrates an example of a captured image acquired by the front camera.

FIG. 6, FIG. 7 and FIG. 8 illustrate examples of a plurality of captured images (frames) SG acquired by the front camera 2F in time series. The captured image SG in FIG. 6 is a oldest image and the captured image SG in FIG. 8 is a latest image. Each captured image SG from FIG. 6 to FIG. 8 includes an image Ob of a same object approaching the host vehicle 9. The image processing circuit 13 performs the object detection process of each of the plurality of the captured images SG acquired periodically and detects the object approaching the host vehicle 9.

The image processing circuit 13 performs the object detection process of each of two detection areas TA set in a right side and a left side of the captured image SG, as process targets. The two detection areas TA are set near a vertical center of the captured image SG And, one of the detection area TA is set in the left side of the captured image SG and the other detection area TA is set on the right side of the captured image SG respectively. It is recommended that these detection areas TA should include a vanishing point (in perspective, an intersection point of images of objects that are actually parallel lines) which is a theoretically infinite distance.

Figure 9:
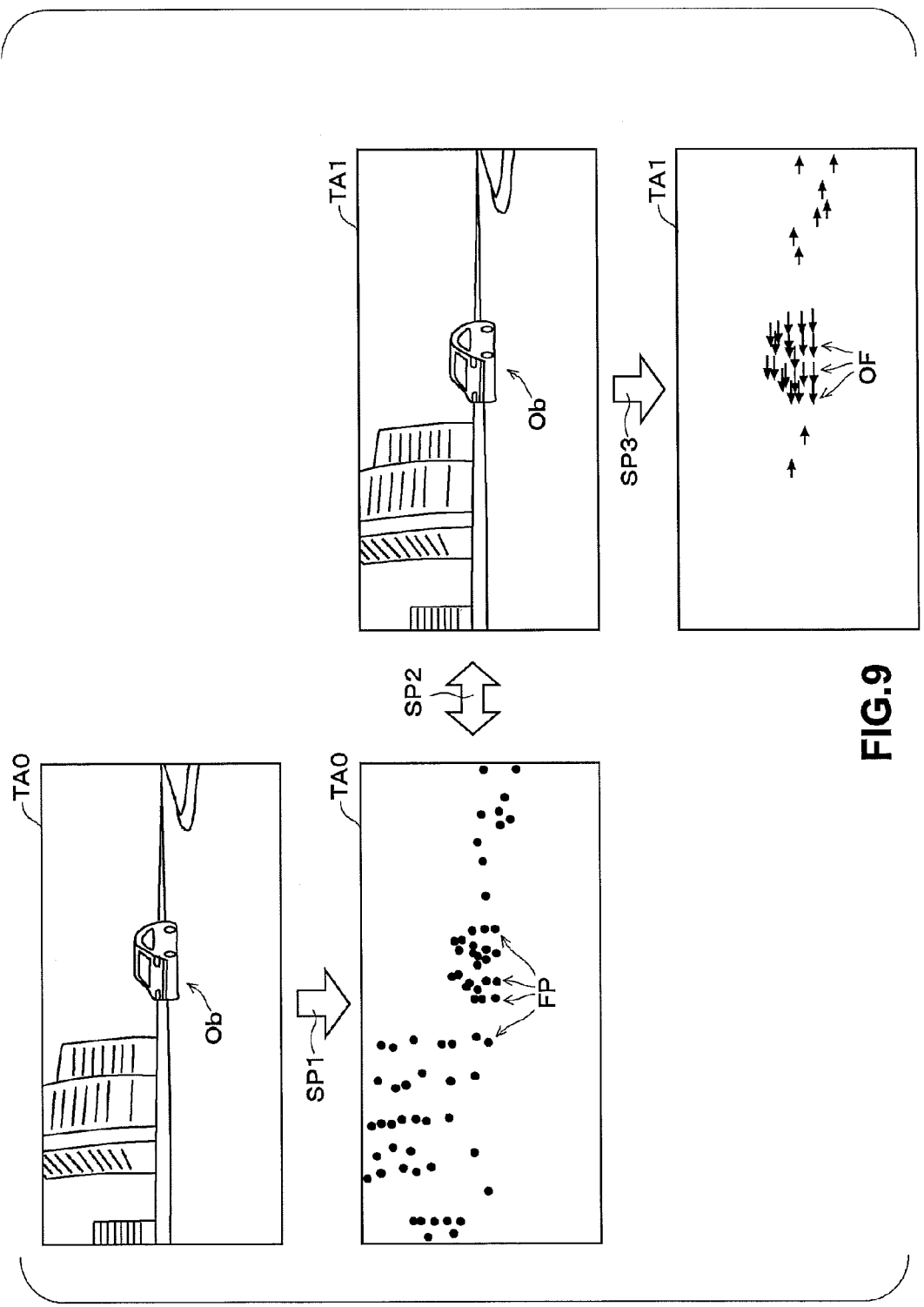
FIG. 9 illustrates an outline of an optical flow method.
Figure 10:
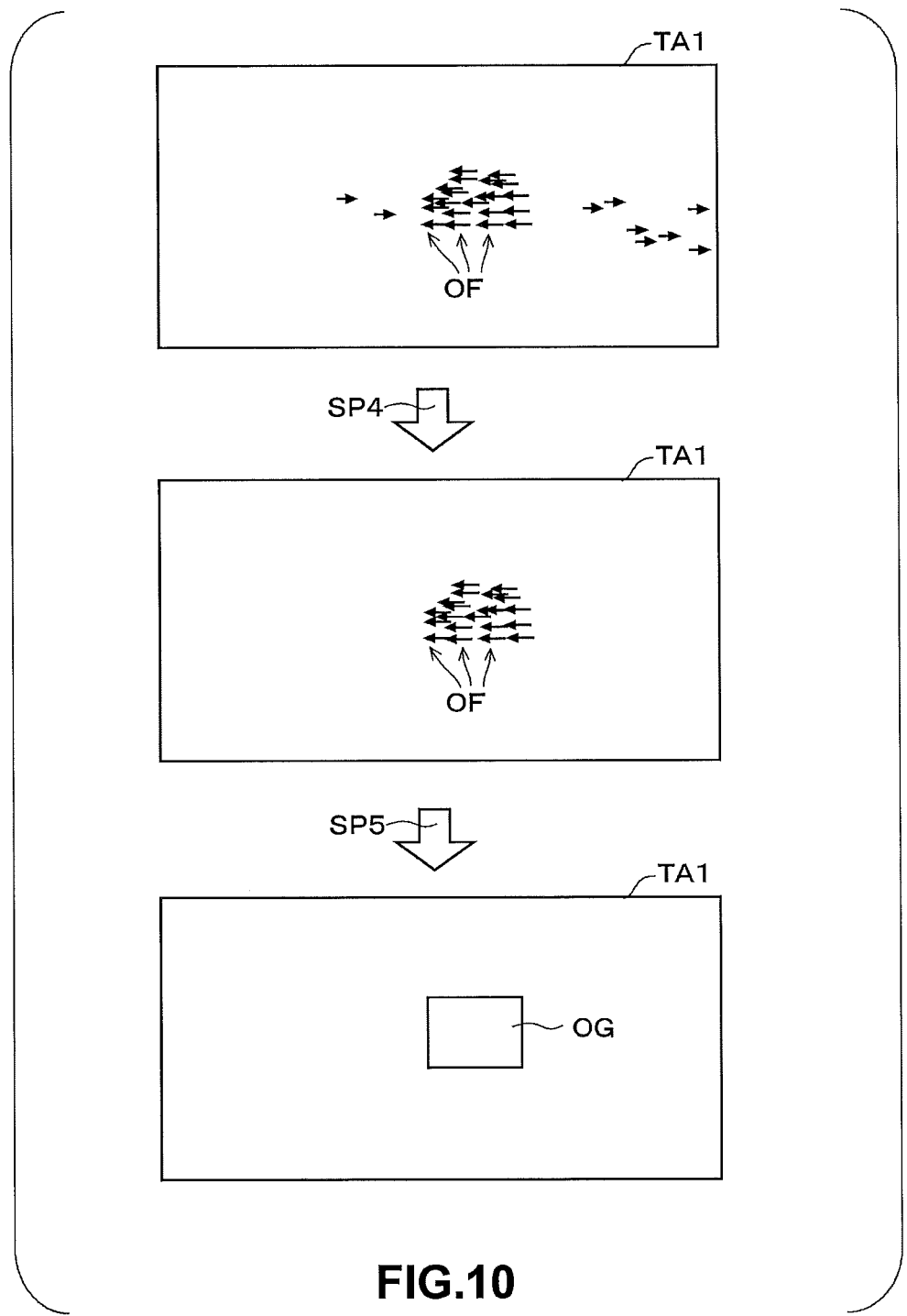
FIG. 10 illustrates an outline of the optical flow method.

Each of FIG. 9 and FIG. 10 illustrates an outline of the object detection process by the optical flow method. Those drawings illustrate, as an example, a case where the detection area TA is set on the right side of the captured image.

Moreover, FIG. 9 illustrates the detection area TA of two captured images (frames) acquired temporally continuously. A detection area TA 1 on a right side of FIG. 9 is the detection area TA of a captured image acquired most recently. On the other hand, a detection area TA0 on a left side of FIG. 9 is the detection area TA of a past captured image acquired one frame before the most recent captured image. In this explanation, the most recent captured image is referred to as "current frame" and the past captured image is referred to as "previous frame." With reference to FIG. 9 and FIG. 10, the outline of the object detection process by the optical flow method is described below.

At a starting point of the object detection process, a plurality of feature points FP in the detection area TA0 in the previous frame have been derived. The feature points FP are distinct points that can be detected in the captured image, and the feature points FP have been derived in a previous object detection process (a step SP1). These feature points FP in the previous frame (hereinafter referred to as "previous feature points") are stored in the memory 18.

In the object detection process, the detection area TA0 of the previous frame is compared with a detection area TA1 of the current frame, and the previous feature points FP are tracked (a step SP2). In other words, based on a close pixel value, a point in the current frame which is a move destination of each of the previous feature points FP is determined as "tracked feature point." Then, the previous feature points FP are associated with the tracked feature points.

Next, vectors pointing from the associated previous feature points FP to the tracked feature points are derived as optical flows OF (a step SP3). Each of the optical flows OF represents move of the feature point PF from a captured image to a subsequent capture image (hereinafter referred to simply as "feature point(s) between captured images").

The optical flows OF are in variety, such as a right-pointing optical flow and a left-pointing optical flow. The object image Ob of the object approaching the host vehicle 9 normally moves inward (toward a center portion from a right end portion or a left end portion of the captured image). Therefore, only optical flows pointing inward are selected to be processed as process targets (a step SP4 in FIG. 10), and optical flows pointing away from the host vehicle 9 are excluded from the process. In the detection area TA1 shown in FIG. 10, only the left-pointing optical flows OF are selected as the process targets.

Next, the feature points (tracked feature points) relating to the optical flows selected as the process targets are compared, and a plurality of the feature points that are close to each other are grouped as a group OG Then, the group OG is detected as an object (a step SP5).

In a case where such an optical flow method is used, since there is no change in a relative position between the host vehicle 9 and a subject to be in a background (hereinafter referred to simply as "background object"), other than the moving object, while the host vehicle 9 is stopped, no optical flow for the background object is derived.

On the other hand, while the host vehicle 9 is traveling, since there is a change in the relative position between the background object and the host vehicle 9, optical flows are also derived for the background object. Normally, since optical flows relating to such a background object points outward, the optical flows relating to the background object are excluded from the process.

However, under certain conditions, there is a case where the optical flows relating to the background object points inward. For example, while the host vehicle 9 is rotating, there is the case where the optical flows relating to the background object points inward. Moreover, there is a case where optical flows relating to a road marking or a lane-dividing line (white line) on a road, etc. points inward due to erroneous tracking of feature points and for other reasons. Thus, optical flows relating to such a background object may cause erroneous object detection. To avoid such erroneous object detection, it is necessary to lower object detection sensitivity.

On the other hand, as described above, although the optical flows relating to the background object are derived while the host vehicle 9 is traveling, the optical flows relating to the background object are not derived while the host vehicle 9 is stopped. Therefore, while the host vehicle 9 is stopped, it is not necessary to lower the object detection sensitivity to avoid erroneous object detection caused by the optical flows relating to the background object.

Therefore, the object detection apparatus 1 in this embodiment adjusts the object detection sensitivity, depending on the velocity of the host vehicle 9. Specifically, the object detection sensitivity is relatively decreased while the host vehicle 9 is traveling. On the other hand, the object detection sensitivity is relatively increased while the host vehicle 9 is stopped. Therefore, the erroneous object detection can be prevented while the host vehicle 9 is traveling and object detection performance of the object detection apparatus 1 can be improved while the host vehicle 9 is stopped.

In the object detection apparatus 1 in this embodiment, the parameter setter 61 sets the parameters that are used for the object detection process, according to the velocity of the host vehicle 9. Thus, the parameter setter 61 adjusts the object detection sensitivity. The parameters affect the number of the feature points on which the optical flows are derived (hereinafter referred to as "target feature points for deriving the optical flows"). The parameters are hereinafter referred to as "feature point parameter(s)."

<3. Flow of the Operation>

Figure 11:
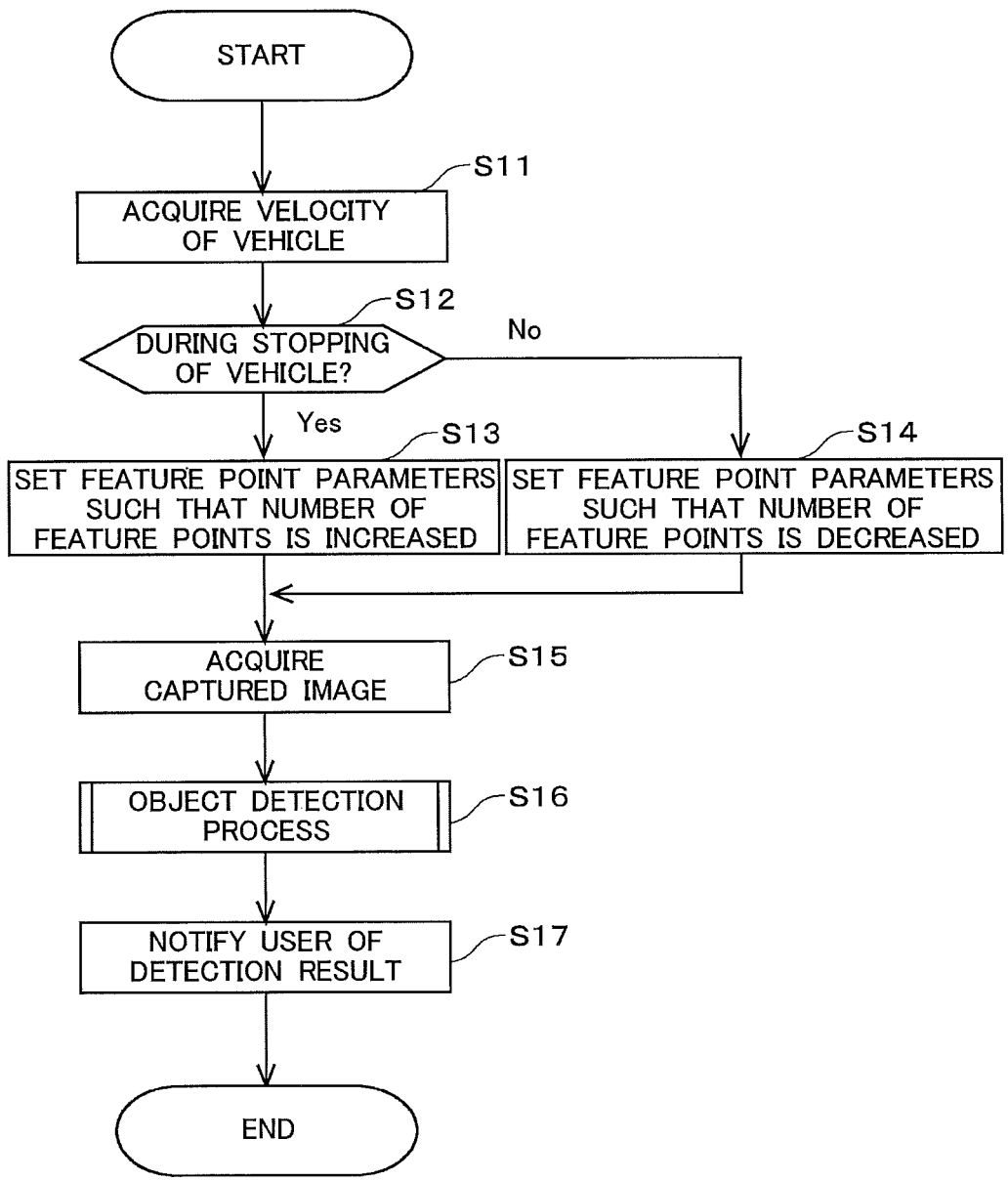
FIG. 11 illustrates an operation flow of the object detection apparatus.

An operation of the object detection apparatus 1 is described below. FIG. 11 illustrates a flow of the operation of the object detection apparatus 1. A process illustrated in FIG. 11 is performed for one frame each and is repeated in a predetermined time cycle (for example, 1/30 second cycle).

First, the signal receiver 16 acquires the velocity of the host vehicle 9 (a step S11). The signal receiver 16 receives the signal transmitted from the velocity sensor 72 and acquires the velocity of the host vehicle 9.

Next, the parameter setter 61 determines whether or not the host vehicle 9 is stopped or is traveling, based on the velocity acquired by the signal receiver 16 (a step S12). The parameter setter 61 determines that the host vehicle 9 is stopped in a case where the velocity of the host vehicle 9 is a threshold value (for example, 0.1 km/h) or less.

In a case where the host vehicle 9 is stopped (Yes in the step S12), the parameter setter 61 sets the feature point parameters such that the number of the feature points is relatively increased (a step S13). On the other hand, in a case where the host vehicle 9 is traveling (No in the step S12), the parameter setter 61 sets the feature point parameters such that the number of the feature points is relatively decreased (s step S14). In other words, the parameter setter 61 sets the feature point parameters such that the number of the feature points is increased while the host vehicle 9 is stopped as compared to while the host vehicle 9 is traveling. The set feature point parameters are used for the object detection process that is performed subsequently (a step S16). A specific example of the feature point parameters will be described later.

Since the parameter setter 61 sets the feature point parameters as described above, the number of the target feature points for deriving the optical flows is increased while the host vehicle 9 is stopped. Therefore, in the case where the host vehicle 9 is stopped, the object detection sensitivity is raised. Thus, the object detection performance of the object detection apparatus can be improved. On the other hand, in the case where the host vehicle 9 is traveling, the number of the target feature points for deriving the optical flows is decreased. Therefore, in the case where the host vehicle 9 is traveling, the object detection sensitivity is lowered. Thus, the erroneous object detection can be prevented.

In the process illustrated in FIG. 11, the parameter setter 61 always sets the feature point parameters in either the step S13 or in the step S14. However, the feature point parameters may be set only when a state of the host vehicle 9 is changed from being stopped to being traveling or vice versa.

Once the parameter setter 61 sets the feature point parameters, the image acquisition part 12 acquires from the camera 2, according to the operation mode, one captured image (frame) which is to be a process target in a current object detection process (a step S15).

Next, the image processing circuit 13 performs the object detection process, using the captured image acquired by the image acquisition part 12 and the feature point parameters set by the parameter setter 61 (a step S16). In a case where the image processing circuit 13 detects an object in the object detection process, the image processing circuit 13 outputs a detection result to the controller 11.

Once receiving the detection result of the object detection process, the result notification part 62 in the controller 11 notifies the user of the detection result (a step S17). The result notification part 62 causes the display image showing the detection result to be displayed on the display 3 together with the captured image. Furthermore, the result notification part 62 causes the speaker 4 to output a warning sound in response to the detection result.

Figure 12:
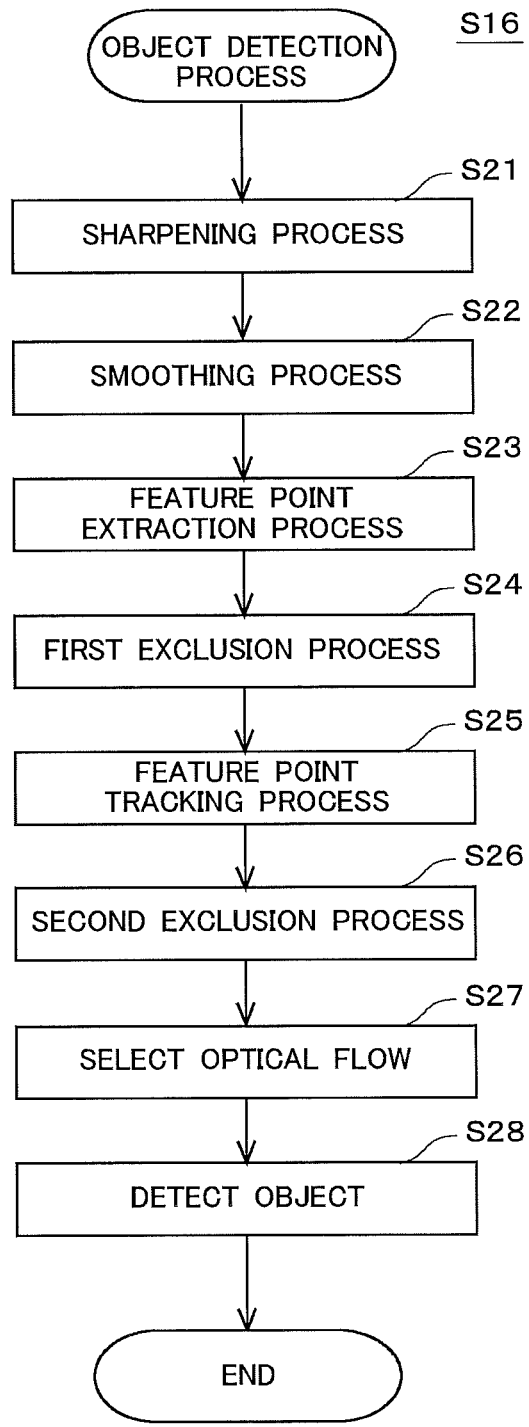
FIG. 12 illustrates a detailed flow of the object detection process.

Next, the object detection process (the step S16) performed by the image processing circuit 13 is described in detail. FIG. 12 illustrates a detailed flow of the object detection process. The object detection process is performed for each of the two detection areas TA in the right side and the left side of the captured image.

At a starting point of the object detection process, the one captured image to be the process target in the current object detection process has been acquired. In this description, the one captured image (a most recent captured image) to be the process target in the current object detection process is referred to as "current frame," and the captured image which has been the process target in the previous object detection process (captured image which is one frame before the current frame) is referred to as "previous frame."

First, the sharpening part 51 performs the sharpening process of the current frame to emphasize change of pixel values (a step S21). The sharpening part 51 performs the sharpening process by a sharpening method using, for example, a Laplacian filter. In the sharpening method, the change of the pixel values is emphasized by subtracting, from a pre-processed original image, a result of the Laplacian filter for performing second differentiation.

Figure 13:
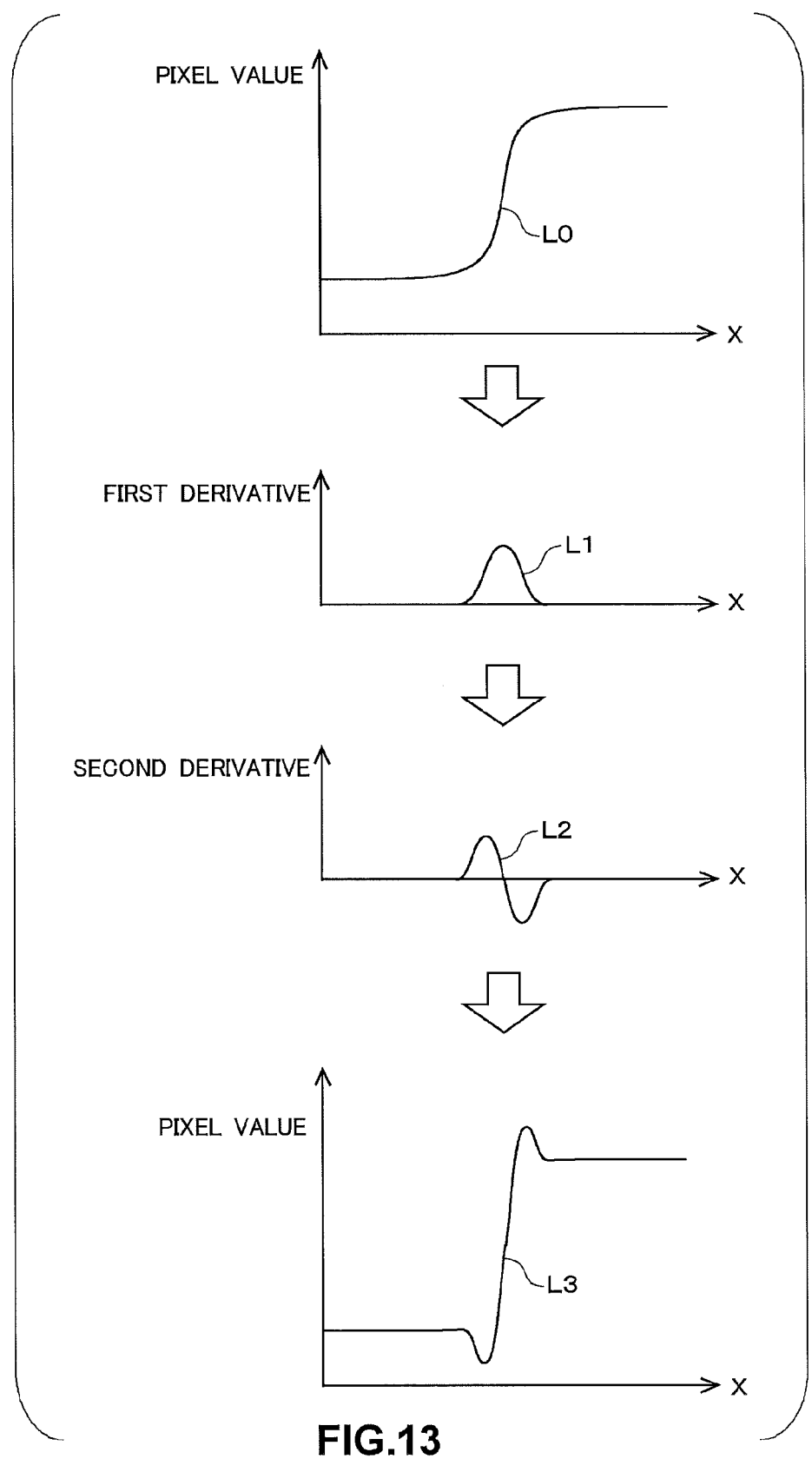
FIG. 13 illustrates an outline of a sharpening method.

FIG. 13 illustrates an outline of the sharpening method using the Laplacian filter. A horizontal axis of a graph in FIG. 13 represents positional coordinates in an image, and a vertical axis represents values.

A curve L0 at a top of FIG. 13 shows change of the pixel values (brightness value) of a contour portion in the pre-processed original image. Also, a curve L1 shows first derivatives which are results from differentiation of the curve L0 of the original image, and a curve L2 shows second derivatives which are results from further differentiation of the curve L1. A curve L3 is obtained by subtracting the second derivatives (the curve L2) from the pixel values (the curve L0) of the original image.

The curve L3 at a bottom of FIG. 13 shows change of the pixel values (brightness values) in a same portion of a post-processed image. In the post-processed image, a gradient of the change of the pixel values is greater, and an undershoot and an overshoot which are not in the original image, are generated. Thus, the change of the pixel values of the contour portion is emphasized, and the object image is sharpened.

In the sharpening method, by changing a reflection percentage for reflecting the second derivatives (results of the Laplacian filter) to the pixel values (curve L0) of the original image, a sharpening strength can be changed. In other words, the reflection percentage for the second derivatives corresponds to the sharpening strength. Thus, as the reflection percentage is raised, the sharpening strength become greater.

In a case where the feature points are extracted from the image after the sharpening process, when the sharpening strength is great, the number of the feature points is relatively increased, and when the sharpening strength is small, the number of feature points is relatively decreased. Therefore, in this embodiment, the sharpening strength in the sharpening process is one of the feature point parameters.

In the steps S13 and S14 in FIG. 11, the parameter setter 61 sets the sharpening strength to a relatively great value while the host vehicle 9 is stopped and sets the sharpening strength to a relatively small value while the host vehicle 9 is traveling. The sharpening part 51 performs the sharpening process of the current frame prior to extracting the feature points, using the reflection percentage of the second derivatives corresponding to the sharpening strength set by the parameter setter 61. Thus, in a case where the feature points are extracted from the current frame after the sharpening process, the number of the feature points is relatively increased while the host vehicle 9 is stopped and the number of the feature points is relatively decreased while the host vehicle 9 is traveling.

With reference back to FIG. 12, after the sharpening process, the smoothing part 52 performs the smoothing process of the current frame to reduce the change in the pixel values (a step S22). The smoothing part 52 performs the smoothing process, for example, by a smoothing method using a moving average filter (averaging filter). In this smoothing method, the change of the pixel values is reduced by determining an average result of values of pixels in a neighborhood of a target pixel as a pixel value of the target pixel. Thus, the random noises included in the image can be removed.

Figure 14:
FIG. 14 illustrates an example of a moving average filter.
Figure 15:
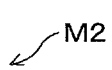
FIG. 15 illustrates an example of a moving average filter.

FIG. 14 and FIG. 15 illustrate examples of the moving average filters used in the smoothing method. FIG. 14 illustrates a moving average filter M1 for averaging 3×3 pixels in the neighborhood of the target pixel. On the other hand, FIG. 15 illustrates a moving average filter M2 for averaging 5×5 pixels in the neighborhood of the target pixel. As shown in FIG. 15, as the number of the neighboring pixels to be averaged, as average targets, is increased by increasing a size of the moving average filter, a smoothing strength becomes greater. In other words, a size of the moving average filter corresponds to the smoothing strength.

In a case where the feature points are extracted from the image after the smoothing process as described above, when the smoothing strength is great, the number of the feature points is relatively decreased and when the smoothing strength is small, the number of the feature points is relatively increased. Therefore, in this embodiment, the smoothing strength in the smoothing process is one of the feature point parameters.

In the steps S13 and S14 in FIG. 11, the parameter setter 61 sets the smoothing strength to a relatively small value while the host vehicle 9 is stopped and sets the smoothing strength to a relatively great value while the host vehicle 9 is traveling. The smoothing part 52 performs the smoothing process of the current frame prior to extracting the feature points, using a size of the moving average filter corresponding to the smoothing strength set by the parameter setter 61. Thus, in a case where the feature points are extracted from the current frame after the smoothing process, the number of the feature points is relatively increased while the host vehicle 9 is stopped and the number of the feature points is relatively decreased while the host vehicle 9 is traveling.

With reference back to FIG. 12, after the smoothing process, the feature point extractor 53*a* of the flow deriving part 53 performs the feature point extraction process (a step S23). Using, for example, a well-known method, such as the Harris operator, the feature point extractor 53*a* extracts the feature points based on only the pixel values of the current frame. Thus, the feature point extractor 53*a* extracts corners (intersection points of edges) and the like in an image of an object as the feature points. The feature points extracted based on only the pixel value of the current frame as described above are referred to as "extraction feature points."

Next, the feature point exclusion part 53*c* of the flow deriving part 53 performs a first exclusion process for excluding, from a subsequent process, a part of the extraction feature points extracted by the feature point extractor 53*a* (a step S24).

As the number of the feature points to be the process targets is increased, a processing load of the controller 11 and the image processing circuit 13 becomes larger and thus a processing speed may be lowered. Therefore, as for an area having a high density of the extraction feature points, the feature point exclusion part 53*c* leaves the extraction feature points having a maximum edge strength as a representative process target and excludes other extraction feature points from the process.

Figure 16:
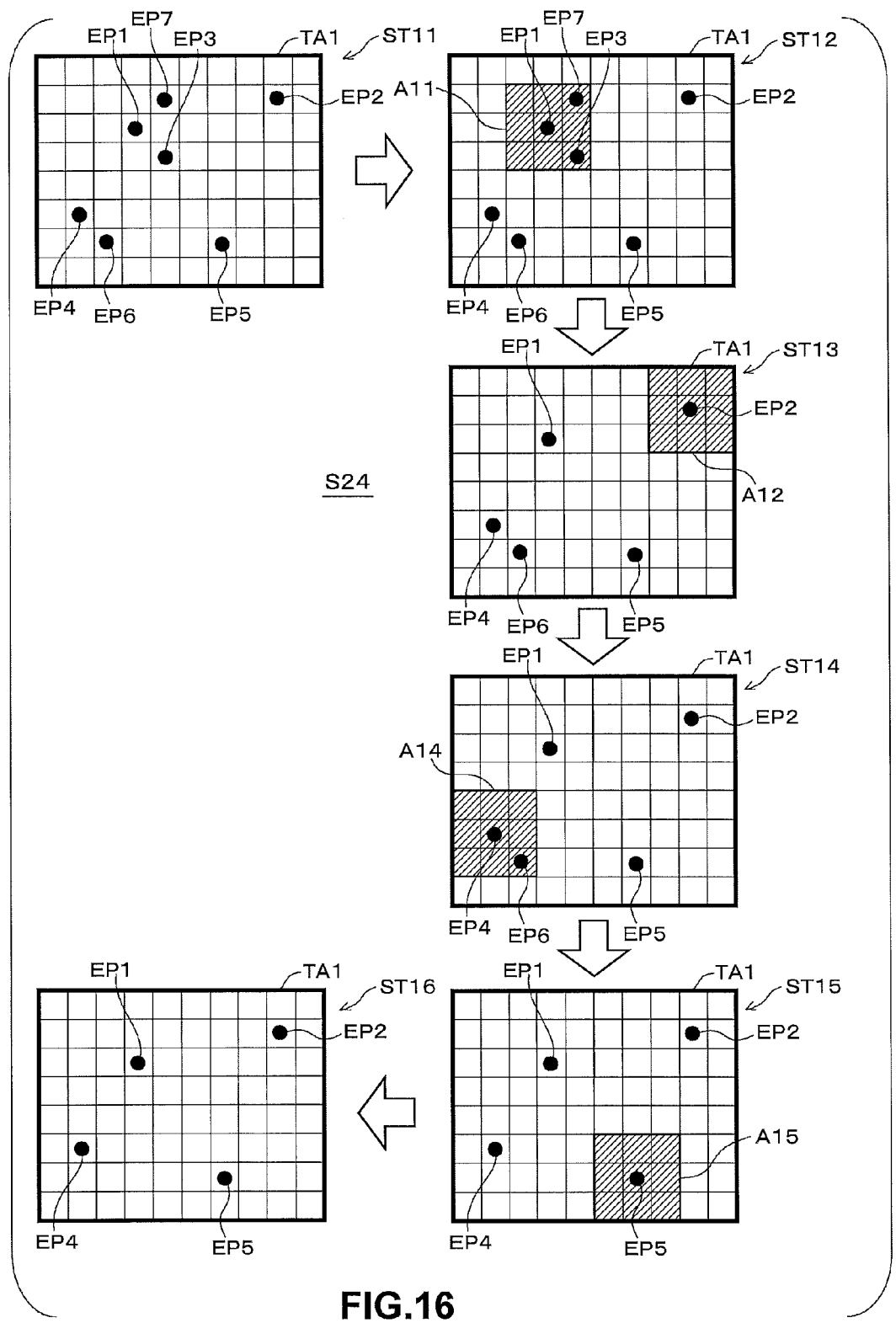
FIG. 16 illustrates a procedure of the first exclusion process.

FIG. 16 illustrates a procedure of the first exclusion process (the step S24). FIG. 16 schematically illustrates a part of the detection area TA1 in the current frame.

In the illustrated detection area TA1, as shown in a state ST11, seven extraction feature points EP1 to EP7 are extracted by the feature point extractor 53*a*. These seven extraction feature points are, in a descending order of edge strength, the extraction feature point EP1, the extraction feature point EP2, the extraction feature point EP3, the extraction feature point EP4, the extraction feature point EP5, the extraction feature point EP6 and the extraction feature point EP7.

The feature point exclusion part 53*c* selects one of the extraction feature points as a target feature point, in the descending order of edge strength. In a case where one or more other extraction feature points are included in an evaluation area having the target feature point in a center, the other extraction feature points are excluded from a subsequent process. In an example of FIG. 16, a size of the evaluation area is 3×3 pixels.

In an example of FIG. 16, first, the feature point exclusion part 53*c* selects the extraction feature point EP1 having a largest edge strength, as the target feature point. Then, as shown in a state ST12, the feature point exclusion part 53*c* sets an evaluation area A11 having the extraction feature point EP1 in a center and determines whether or not any other extraction feature point is included in the evaluation area A11. In this example, since the two extraction feature points EP3 and EP7 are included in the evaluation area A11, the feature point exclusion part 53*c* excludes these two extraction feature points EP3 and EP7 from the process.

Subsequently, the feature point exclusion part 53*c* selects the extraction feature point EP2 having a next largest edge strength, as the target feature point. Then, as shown in a state ST13, the feature point exclusion part 53*c* sets an evaluation area A12 having the extraction feature point EP2 in a center and determines whether or not any other extraction feature point is included in the evaluation area A12. In this example, since the evaluation area A12 does not include any other extraction feature point, a process for excluding the extraction feature point is not performed.

Subsequently, the feature point exclusion part 53*c* selects the extraction feature point EP4 having a next largest edge strength, as the target feature point. At this point, the feature point exclusion part 53*c* selects the extraction feature point EP4 as a next target feature point since the feature point exclusion part 53*c* has already excluded the extraction feature point EP3 from the process. Then, as shown in a state ST14, the feature point exclusion part 53*c* sets an evaluation area A14 having the extraction feature point EP4 in a center and determines whether or not any other extraction feature point is included in the evaluation area A14. In this example, since the extraction feature point EP6 is included in the evaluation area A14, the feature point exclusion part 53*c* excludes the extraction feature point EP6 from the process.

Subsequently, the feature point exclusion part 53*c* selects the extraction feature point EP5 having a next largest edge strength as the target feature point. Then, as shown in a state ST15, the feature point exclusion part 53*c* sets an evaluation area A15 having the extraction feature point EP5 in a center and determines whether or not any other extraction feature point is included in the evaluation area A15. In this example, since the evaluation area A15 does not include any other extraction feature point, the process for excluding the extraction feature point is not performed.

And, at this point, since there is no extraction feature point having a next largest edge strength in the illustrated detection area TA1, the feature point exclusion part 53*c* ends the first exclusion process. As a result of the first exclusion process as described above, as shown in a state ST16, in the detection area TA1, only the four extraction feature points EP1, EP2, EP4 and EP 5 are left as the process targets of the subsequent process.

As for the first exclusion process as described above, in a case where a size of the evaluation area to be used is large (e.g., 5×5 pixels), since more extraction feature points are excluded from the process, the number of the extraction feature points left as the process targets is relatively decreased. On the other hand, in a case where the size of the evaluation area to be used is small (e.g., 3×3 pixels), since fewer extraction feature points are excluded from the process, the number of the extraction feature points left as the process targets is relatively increased. Therefore, in this embodiment, the size of the evaluation area to be used for the first exclusion process is one of the feature point parameters.

In the steps S13 and S14 in FIG. 11, the parameter setter 61 sets the size of the evaluation area to a relatively small size while the host vehicle 9 is stopped, and sets the size of the evaluation area to a relatively large size while the host vehicle 9 is traveling. The feature point exclusion part 53*c* performs the first exclusion process of the current frame, using the evaluation area of the size set by the parameter setter 61. Thus, the number of the extraction feature points left as the process targets is relatively increased while the host vehicle 9 is stopped, and the number of the extraction feature points left as the process targets is relatively decreased while the host vehicle 9 is traveling.

With reference back to FIG. 12, once the first exclusion process is performed, the feature point tracking part 53b of the flow deriving part 53 performs a feature point tracking process for tracking the previous feature points in the previous frame (a step S25). The feature point tracking part 53b determines the tracked feature points which are points in the current frame corresponding to the previous feature points in the previous frame.

Figure 17:
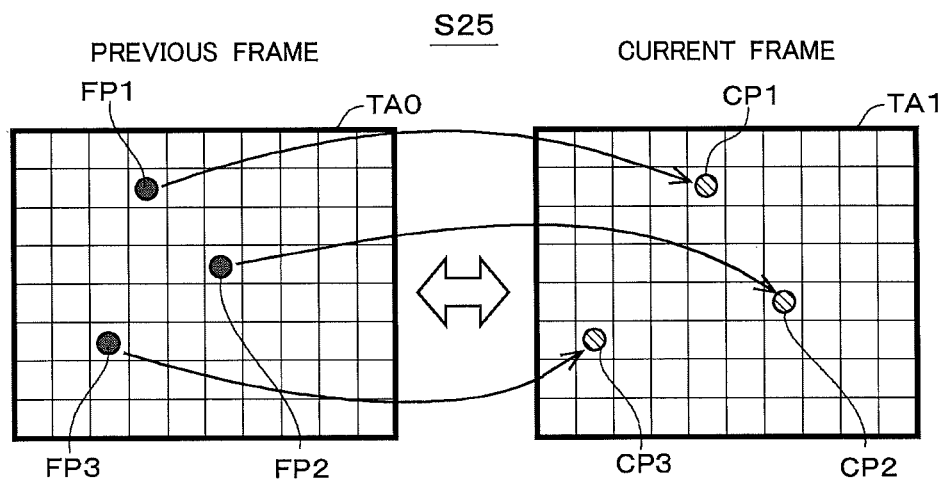
FIG. 17 illustrates a procedure for the feature points tracking process.

FIG. 17 illustrates a procedure for the feature point tracking process (the step S25). FIG. 17 schematically illustrates a part of the detection area TA0 in the previous frame and a part of the detection area TA1 in the current frame. These detection areas TA0 and TA1 are areas showing a same position in the captured images. In the detection area TA0 in the illustrated previous frame, there are three previous feature points FP1, FP2 and FP3.

The feature point tracking part 53b selects each of the previous feature points as the target feature point and determines the tracked feature point corresponding to the target feature point. The feature point tracking part 53b sets a block of a predetermined size (e.g., 3×3 pixels) having the target feature point in the previous frame in a center. The feature point tracking part 53b searches the detection area TA1 in the current frame for an area having a pixel value approximate to a pixel value of the block. Then, the feature point tracking part 53b determines a center point of the searched area as the move destination of the target feature point, i.e., as the tracked feature point, and associates the target feature point with the tracked feature point.

In an example of FIG. 17, the feature point tracking part 53b performs the process described above for each of the three previous feature points FP1, FP2 and FP3. Thus, the feature point tracking part 53b associates the previous feature point FP1 with a tracked feature point CP1, the previous feature point FP2 with a tracked feature point CP2, and the previous feature point FP3 with a tracked feature point CP3.

After determining the tracked feature points relating to the previous feature points as described above, the feature point tracking part 53b derives the optical flows based on the previous feature points and the tracked feature points which have been associated with each other. In other words, the feature point tracking part 53b derives the vectors pointing from the associated previous feature points to the tracked feature points as optical flows.

With reference back to FIG. 12, once the feature point tracking process is performed, the feature point exclusion part 53c of the flow deriving part 53 performs a second exclusion process for excluding a part of the extraction feature points from subsequent process, based on the tracked feature points (a step S26).

At this point, the extraction feature points extracted by the feature point extractor 53a in the feature point extraction process (the step S23) and the tracked feature points determined by the feature point tracking part 53b in the feature point tracking process (the step S25), exist. The extraction feature point and the tracked feature point may be the feature points relating to the same portion of a subject. As described above, as the number of the feature points to be the process targets is increased, the processing load of the controller 11 and the image processing circuit 13 becomes larger and thus the processing speed may be lowered. Therefore, in a case where the extraction feature point and the tracked feature point are determined to be the feature points relating to the same portion of the subject, the feature point exclusion part 53c leaves only the tracked feature point as a representative process target, and excludes the extraction feature point from the process.

Figure 18:
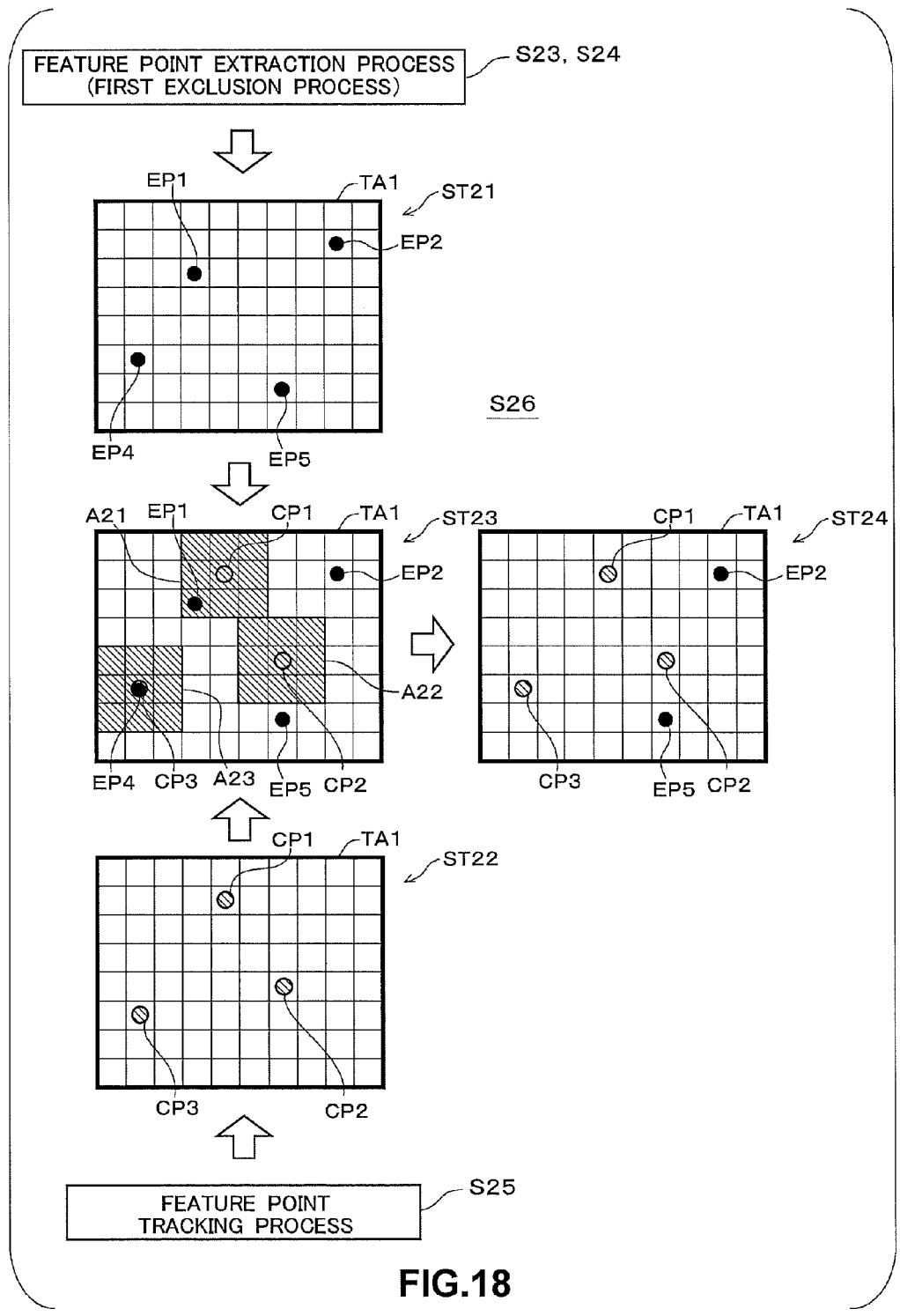
FIG. 18 illustrates a procedure for the second exclusion process.

FIG. 18 illustrates a procedure for the second exclusion process (the step S26). FIG. 18 schematically illustrates a part of the detection area TA1 in the current frame.

In the illustrated detection area TA1, as shown in a state ST21, after the feature point extraction process and the first exclusion process (the step S23 and the step S24), the four extraction feature points EP1, EP2, EP4, and EP5 are left as the process targets. In the detection area TA1, as shown in a state ST22, after the feature point tracking process (the step S25), the three tracked feature points CP1, CP2 and CP3 are determined.

The feature point exclusion part 53c selects each of the tracked feature points as the target feature point, and in a case where one or more extraction feature points are included in an evaluation area having the target feature point in a center, the feature point exclusion part 53c excludes the extraction feature points included in the evaluation area from a subsequent process. In an example of FIG. 18, a size of the evaluation area is 3×3 pixels.

The example of FIG. 18 describes a case where the feature point exclusion part 53c selects the tracked feature point CP1 as the target feature point. In this case, as shown in a state ST23, the feature point exclusion part 53c sets an evaluation area A21 having the tracked feature point CP1 in a center, and judges whether or not any extraction feature point is included in the evaluation area A21. In this example, since the extraction feature point EP 1 is included in the evaluation area A21, the feature point exclusion part 53c excludes the extraction feature point EP1 from the process.

Also, in a case where the feature point exclusion part 53c selects the tracked feature point CP2 as the target feature point, the feature point exclusion part 53c determines whether or not any extraction feature point is included in an evaluation area A22 having the tracked feature point CP2 in a center. In this example, since the extraction feature point is not included in this evaluation area A22, the process for excluding the extraction feature point is not performed.

Also, in a case where the feature point exclusion part 53c selects the tracked feature point CP3 as the target feature point, the feature point exclusion part 53c determines whether or not any extraction feature point is included in an evaluation area A23 having the tracked feature point CP3 in a center. In this example, since the extraction feature point EP4 is included in this evaluation area A23, the feature point exclusion part 53c excludes the extraction feature point EP4 from the process.

As a result of the second exclusion process as described above, as shown in a state ST24, in the detection area TA1, only the three tracked feature points CP1, CP2 and CP4, and the two extraction feature points EP2 and EP5 are left as the process targets for a subsequent process.

As for the second exclusion process as described above, in a case where a size of the evaluation area to be used is large (e.g.; 5×5 pixels), since more extraction feature points are excluded from the process, the number of the extraction feature points left as the process targets is relatively decreased. On the other hand, in a case where the size of the evaluation area to be used is small (e.g., 3×3 pixels), since fewer extraction feature points are excluded from the process, the number of the extraction feature points left as the process targets is relatively increased. Therefore, in this embodiment, the size of the evaluation area to be used for the second exclusion process is one of the feature point parameters.

In the steps S13 and S14 in FIG. 11, the parameter setter 61 sets the size of the evaluation area to a relatively small size while the host vehicle 9 is stopped, and sets the size of the evaluation area to a relatively large size while the host vehicle 9 is traveling. The feature point exclusion part 53c performs the second exclusion process of the current frame, using the evaluation area of the size set by the parameter setter 61. Thus, the number of the extraction feature points left as the process targets is relatively increased while the host vehicle 9 is stopped, and the number of the extraction feature points left as the process targets is relatively decreased while the host vehicle 9 is traveling.

The tracked feature points and the extraction feature points in the current frame left as the process targets after the second exclusion process (the step S26) are stored in the memory 18 and serve as the previous feature points in a next object detection process. In other words, the optical flows are derived based on these tracked feature points and extraction feature points, in the next object detection process. Therefore, the first exclusion process (the step S24) and the second exclusion process (the step S26) performed by the feature point exclusion part 53c can be regarded as a process for excluding feature points from the process for deriving optical flows.

With reference back to FIG. 12, once the second exclusion process is performed, the flow selector 53d of the flow deriving part 53 selects one or more optical flows that satisfy a predetermined condition, from amongst the optical flows derived in the feature point tracking process (the step S25), as the process targets (a step S27). The flow selector 53d selects only one or more inward optical flows having a length larger than a predetermined threshold value (e.g. "1"), as the process targets.

Next, the object detector 54 detects an object based on the optical flows which have been selected as the process targets by the flow selector 53d (a step S28). First, the object detector 54 focuses on each of the tracked feature points of the optical flows. Then, the object detector 54 groups a plurality of the tracked feature points existing in a vicinity of each other as one group, among the tracked feature points.

Figure 19:
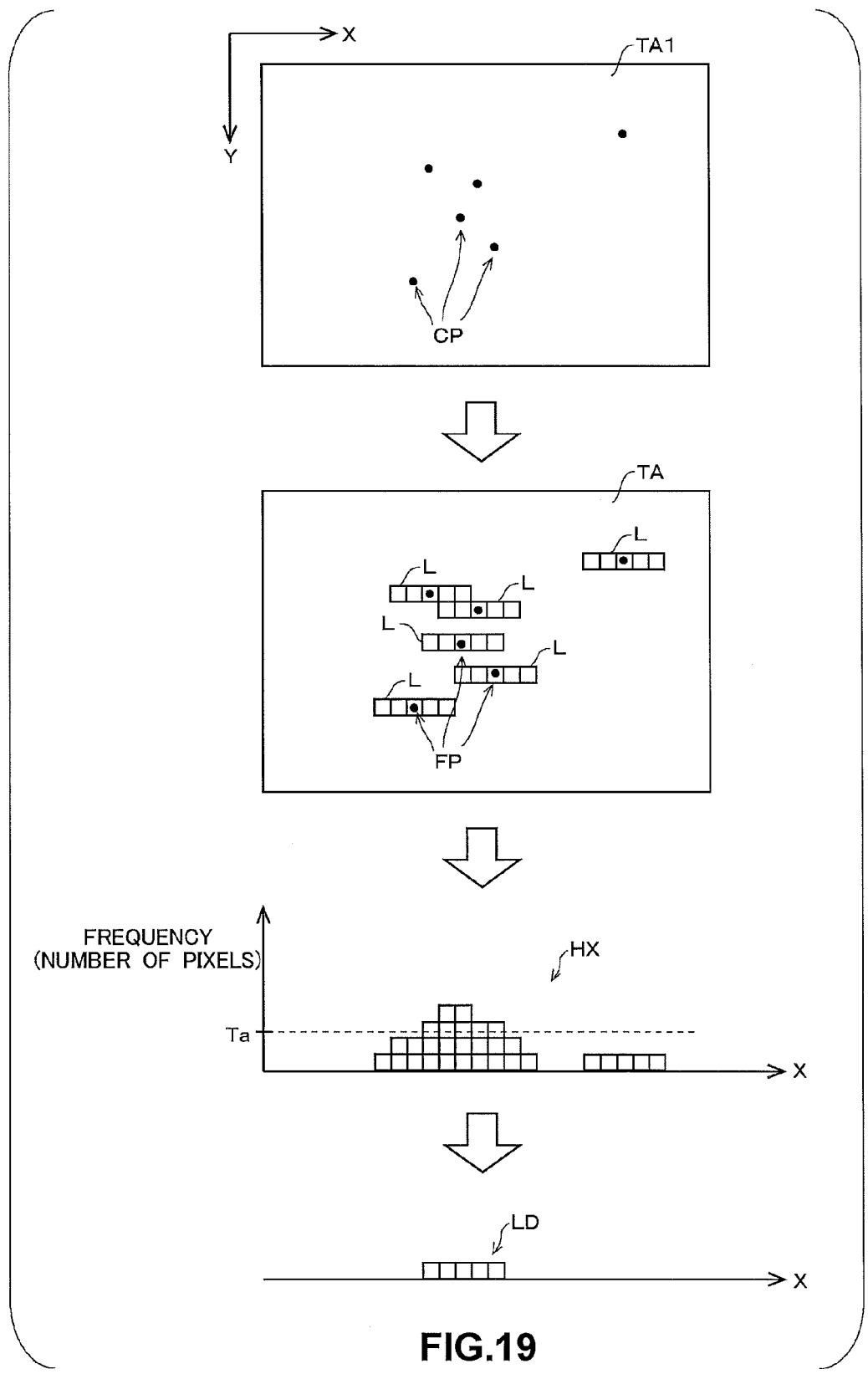
FIG. 19 illustrates a method for grouping feature points.
Figure 20:
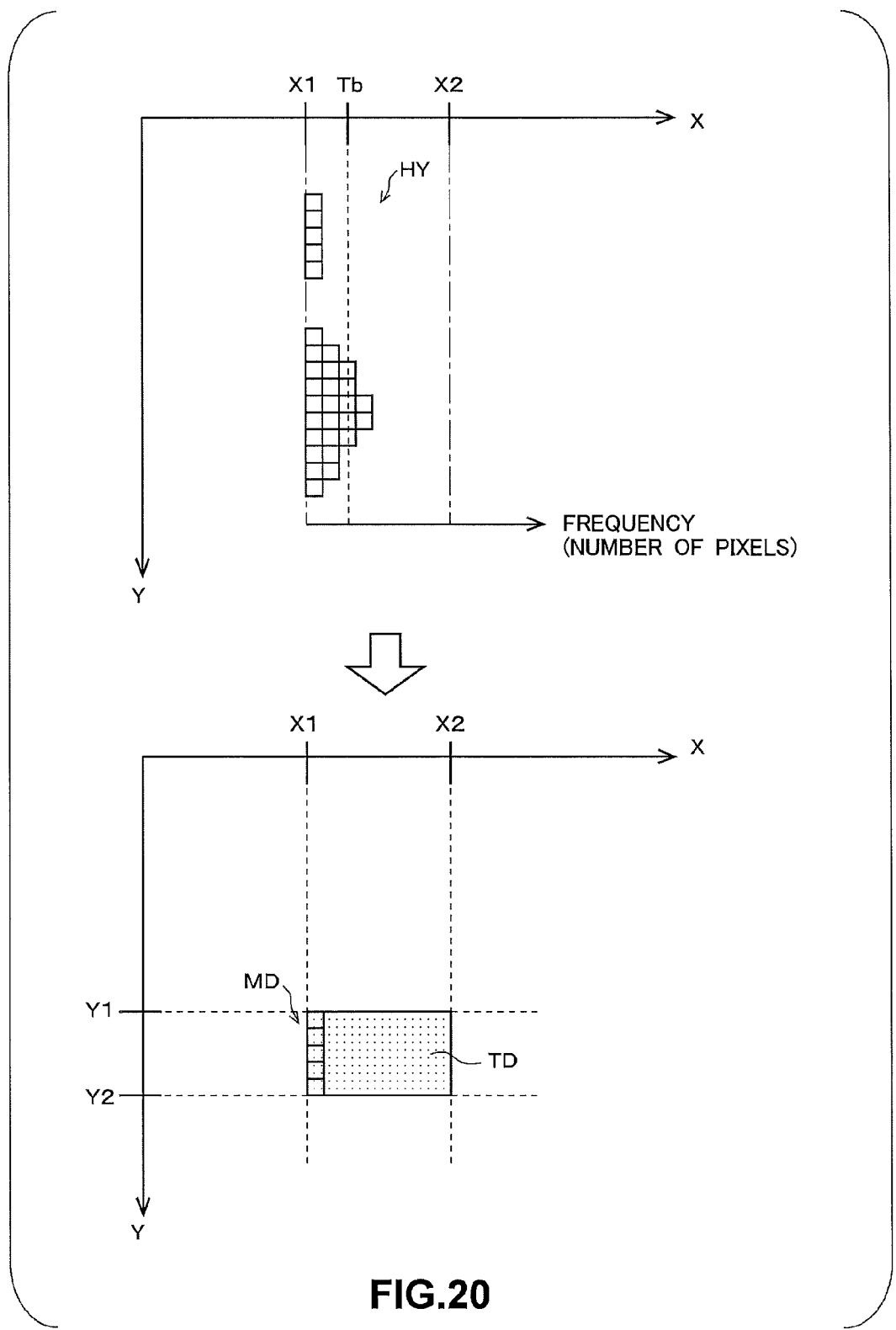
FIG. 20 illustrates the method for grouping feature points.

FIG. 19 and FIG. 20 illustrate a method for grouping such tracked feature points CP. FIG. 19 schematically illustrates a part of the detection area TA1 in the current frame. Moreover, in this description, an X-axis represents a horizontal direction (a right side is a positive side), and a Y-axis represents a vertical direction (a lower side is a positive side).

First, as shown in FIG. 19, the object detector 54 sets a line L extending in the horizontal direction (X-axis direction) on each position of the tracked feature points CP. The line L consists of a pixel column of a specific size (e.g., 5 pixels) having the tracked feature point CP in a center.

Next, referring to the pixels of the lines L, the object detector 54 generates a histogram HX of which a horizontal axis represents position coordinates on the X-axis and of which a vertical axis represents the number of pixels (frequency). In this histogram HX, the number of pixels of lines L existing in the Y-axis direction is shown on each coordinate position on the X-axis, as the frequency.

Next, the object detector 54 compares the frequencies of the histogram HX to a predetermined threshold value Ta (e.g., "3"). Then, as shown in a bottom portion of FIG. 19, the object detector 54 derives line data LD showing an X-axis direction range in which the frequencies are equal to or greater than the threshold value Ta. The line data LD shows the range in which a plurality of the tracked feature points CP exist in a vicinity of each other in the horizontal direction (X-axis direction) of the detection area TA1.

Next, as shown in FIG. 20, the object detector 54 generates a histogram HY of which a vertical axis represents coordinate positions on the Y-axis and of which a horizontal axis represents the number of pixels (frequency). A method for creating the histogram HY is a method in which the X-axis and the Y-axis are replaced in a method for creating the histogram FIX shown in FIG. 19. However, the object detector 54 limits a process target range to be processed in the X-axis direction to a range (X1 to X2) in which each corresponding line data LD exists. The object detector 54 creates such a histogram HY for each line data LD.

Next, the object detector 54 compares the frequencies of the histogram HY to a predetermined threshold value Tb (e.g., "3"). Then, the object detector 54 derives line data MD showing a Y-axis direction range in which the frequencies are equal to or greater than the threshold value Tb. The line data MD shows the range in which a plurality of the tracked feature points CP exist in the vicinity of each other in the vertical direction (Y-axis direction) of the detection area TA1.

Then, as shown in a lower portion of FIG. 20, the object detector 54 groups as one group a plurality of the tracked feature points CP included in a rectangular region TD defined by the X-axis direction range (X1 to X2) in which the line data LD exists and also by the Y-axis direction range (Y1 to Y2) in which the line data MD exists. A size of the group is a size of the rectangular region TD. There is a case where the object detector 54 derives a plurality of groups from one detection area TA1.

The object detector 54 derives the groups by grouping a plurality of the tracked feature points as described above, and then compares the size of each derived group to a predetermined reference size (for example, horizontal 15 pixels×vertical 16 pixels). Then, the object detector 54 excludes the group having the sizes smaller than the reference size, and detects the group having the size larger than the reference size, as the object.

The object detector 54 as described above groups a plurality of the tracked feature points existing in the vicinity of each other as a group, and detects such a group as an object. Therefore, if the number of the target feature points for deriving the optical flows is increased, the tracked feature points are more likely to be grouped and thus the object detection sensitivity is improved. On the other hand, if the number of the target feature points for deriving the optical flows is decreased, the tracked feature points are less likely to be grouped and thus the object detection sensitivity is lowered.

As described above, in the object detection apparatus 1 in this embodiment, the flow deriving part 53 derives the optical flows based on the feature points in the captured images acquired periodically by the camera 2 that captures images of the vicinity of the host vehicle 9, and the object detector 54 detects an object based on the optical flows. Moreover, the signal receiver 16 acquires the velocity of the host vehicle 9, and the parameter setter 61 sets the feature point parameters which affect the number of the feature points, according to the velocity of the host vehicle 9. Therefore, the object detection sensitivity can be adjusted appropriately according to the velocity of the host vehicle 9, and the object detection performance of the object detection apparatus 1 can be improved.

Moreover, the parameter setter 61 determines, based on the velocity of the host vehicle 9, whether or not the host vehicle 9 is stopped or is traveling, and sets the feature point parameters such that the number of the feature points is increased while the host vehicle 9 is stopped as compared to while the host vehicle 9 is traveling. Therefore, by raising the object detection sensitivity while the host vehicle 9 is stopped, the object detection performance of the object detection apparatus 1 can be improved.

<4. Modifications>

The embodiment of the invention is described above. However, the invention is not limited to the foregoing embodiment and other various modifications are possible. Examples of the various modifications will be hereinafter explained. Any of all forms including the foregoing embodiments and the modifications explained below may be appropriately combined with one another.

In the foregoing embodiment, either one of the front camera 2F and the back camera 2B is used as the camera 2 for capturing the images of the vicinity of the vehicle. However, an other camera such as a left side camera for capturing images of a left side of the vehicle and a right side camera for capturing images of a right side of the vehicle may be used.

In the foregoing embodiment, the object detection apparatus 1 detects an object approaching the host vehicle 9. However, the object detection apparatus 1 may detect an object moving in a direction different from approaching, such as an object moving away from the host vehicle 9.

Moreover, in the foregoing embodiment, a part of the image processing (e.g., the sharpening process) described to be performed by the image processing circuit 13 of the object detection apparatus 1 may be performed by an image processor included in a camera 2. In this case, for example, in a case where a sharpening process is performed by the image processor included in the camera 2, a controller 11 transmits a feature point parameter (sharpening strength) set by the parameter setter 61 to the camera 2, as a signal.

Moreover, in the foregoing embodiment, the parameter setter 61 sets the feature point parameters in two phases according to whether the host vehicle 9 is stopped or is traveling. On the other hand, a parameter setter 61 may set feature point parameters in three or more phases according to a velocity of the host vehicle 9. In this case, it is desirable that the parameter setter 61 should set the feature point parameter such that the number of the feature points is increased as the velocity of the host vehicle 9 is lower.

Moreover, functions described as one block in the foregoing embodiment do not necessarily need to be implemented by a single physical element, and the functions may be implemented by separate physical elements. Moreover, functions described as a plurality of blocks in the foregoing embodiment may be implemented by a single physical element. Moreover, a process relating to any one of the functions may be shared by an apparatus in the vehicle and an apparatus outside the vehicle and those apparatuses communicate information to each other. As a result, the one function as a whole may be implemented.

Moreover, in the foregoing embodiment, all or a part of the functions described to be implemented by software may be implemented by an electrical hardware circuit. Moreover, a function described to be implemented by an electrical hardware circuit may be implemented by software. Moreover, a function that is described as a block in the foregoing embodiments may be implemented by cooperation between software and hardware.

For example, in the foregoing embodiment, all or a part of the functions to be implemented by the image processing circuit 13 may be implemented by the controller 11. On the contrary, all or a part of the functions to be implemented by the controller 11 in the foregoing embodiment may be implemented by the image processing circuit 13.

While the invention has been shown and described in detail, the foregoing description is in all aspects illustrative and not restrictive. It is therefore understood that numerous other modifications and variations can be devised without departing from the scope of the invention.

What is claimed is:

1. An object detection apparatus that detects an object in a vicinity of a vehicle, the object detection apparatus comprising:
   (a) an image processing circuit configured to:
      (i) derive vectors representing movement of feature points in captured images acquired periodically by a camera that captures images of the vicinity of the vehicle; and
      (ii) detect the object based on the vectors; and
   (b) a processor configured to
      (i) acquire a velocity of the vehicle; and
      (ii) set a parameter that affects a number of the feature points based on the velocity of the vehicle, wherein the processor determines whether the vehicle is stopped or is traveling, based on the velocity of the vehicle, and sets the parameter such that the number of the feature points is increased while the vehicle is stopped as compared to while the vehicle is traveling.

2. The object detection apparatus according to claim 1, wherein
   the image processing circuit is further configured to:
      (iii) extract the feature points in each of the captured images; and
      (iv) in a case where a second feature point is included in an evaluation area having, in a center, a first one of the feature points, exclude the second feature point from a process for deriving the vectors; wherein
   the parameter includes a size of the evaluation area.

3. The object detection apparatus according to claim 1, wherein
   the image processing circuit is further configured to:
      (iii) extract first feature points based on only a pixel value of one captured image;
      (iv) determine a second feature point that is a point in the one captured image, the second feature point corresponding to a feature point in a previous captured image acquired prior to the one captured image; and
      (v), in a case where one or more first feature points are included in an evaluation area having the second feature point in a center, exclude the included first feature points from a process for deriving the vectors, wherein
   the parameter includes a size of the evaluation area.

4. The object detection apparatus according to claim 1, wherein:
   the image processing circuit is further configured to smooth the captured images prior to extracting the feature points, and
   the parameter includes a smoothing strength used to smooth the captured images.

5. The object detection apparatus according to claim 1, wherein:
   the image processing circuit is further configured to sharpen the captured images prior to extracting the feature point, and the parameter includes a sharpening strength used to sharpen the captured images.

6. An object detection system that detects an object in a vicinity of a vehicle, the object detection system comprising:
(a) a camera that captures images of the vicinity of the vehicle;
(b) an image processing circuit configured to:
(i) derive vectors representing movement of an optical flow based on feature points in the captured images acquired periodically by the camera; and
(ii) detect the object based on the vectors; and
(c) a processor configured to:
(i) acquire a velocity of the vehicle; and
(ii) set a parameter that affects a number of the feature points based on the velocity of the vehicle, wherein the processor determines whether the vehicle is stopped or is traveling, based on the velocity of the vehicle, and sets the parameter such that the number of the feature points is increased while the vehicle is stopped as compared to while the vehicle is traveling.

7. The object detection system according to claim 6, wherein
the image processing circuit is further configured to:
(iii) extract the feature points in each of the captured images; and
(iv), in a case where a second feature point is included in an evaluation area having, in a center, a first one of the feature points, exclude the second feature point from a process for deriving the vectors; wherein
the parameter includes a size of the evaluation area.

8. The object detecting system according to claim 6, wherein
the image processing circuit is further configured to:
(iii) extract first feature points based on only a pixel value of one captured image;
(iv) determine a second feature point that is a point in the one captured image, the second feature point corresponding to a feature point in a previous captured image acquired prior to the one captured image; and
(v), in a case where one or more first feature points are included in an evaluation area having the second feature point in a center, exclude the included first feature points from a process for deriving the vectors, wherein
the parameter includes a size of the evaluation area.

9. An object detection method for detecting an object in a vicinity of a vehicle, the object detection method comprising the steps of:
(a) deriving, with an image processing circuit, vectors representing movement of feature points in captured images acquired periodically by a camera that captures images of the vicinity of the vehicle;
(b) detecting, with the image processing circuit, the object based on the vectors;
(c) acquiring, with a processor, a velocity of the vehicle; and
(d) setting, with the processor, a parameter that affects a number of the feature points based on the velocity of the vehicle, wherein the step (d) determines whether the vehicle is stopped or is traveling, based on the velocity of the vehicle, and sets the parameter such that the number of the feature points is increased while the vehicle is stopped as compared to while the vehicle is traveling.

10. The object detection method according to claim 9, wherein
the step (a) comprises the steps of:
(a1) extracting, with the image processing circuit, the feature points in each of the captured images; and
(a2) in a case where a second feature point is included in an evaluation area having, in a center, a first one of the feature points extracted by the step (a1), excluding the second feature point from a process for deriving the vectors; wherein
the parameter includes a size of the evaluation area.

11. The object detection method according to claim 9, wherein
the step (a) comprises the steps of:
(a1) extracting, with the image processing circuit, first feature points based on only a pixel value of one captured image;
(a2) determining, with the image processing circuit, a second feature point that is a point in the one captured image, the second feature point corresponding to a feature point in a previous captured image acquired prior to the one captured image; and
(a3) in a case where one or more first feature points are included in an evaluation area having the second feature point in a center, excluding the included first feature points from a process for deriving the vectors, wherein
the parameter includes a size of the evaluation area.

12. A non-transitory computer-readable recording medium that stores a program to be executed by a computer that is used in a vehicle, the program causing the computer to execute the steps of:
(a) deriving vectors representing movement of feature points in captured images acquired periodically by a camera that captures images of the vicinity of the vehicle;
(b) detecting an object based on the vectors;
(c) acquiring a velocity of the vehicle; and
(d) setting a parameter that affects a number of the feature points based on the velocity of the vehicle, wherein the step (d) determines whether the vehicle is stopped or is traveling, based on the velocity of the vehicle, and sets the parameter such that the number of the feature points is increased while the vehicle is stopped as compared to while the vehicle is traveling.

13. The recording medium according to claim 12, wherein
the step (a) comprises the steps of:
(a1) extracting the feature points in each of the captured images; and
(a2) in a case where a second feature point is included in an evaluation area having, in a center, a first one of the feature points extracted by the step (a1), excluding the second feature point from a process for deriving the vectors; wherein
the parameter includes a size of the evaluation area.

14. The recording medium according to claim 12, wherein
the step (a) comprises the steps of:
(a1) extracting first feature points based on only a pixel value of one captured image;
(a2) determining a second feature point that is a point in the one captured image, the second feature point corresponding to a feature point in a previous captured image acquired prior to the one captured image; and
(a3) in a case where one or more first feature points are included in an evaluation area having the second feature point in a center, excluding the included first feature points from a process for deriving the vectors, wherein
the parameter includes a size of the evaluation area.

15. The object detection apparatus according to claim 1, wherein
the processor is further configured to set a sharpening strength for processing the images based on the velocity of the vehicle.

* * * * *